United States Patent
Ho

(10) Patent No.: US 8,963,983 B2
(45) Date of Patent: Feb. 24, 2015

(54) MOBILE TERMINAL AND METHOD OF CONTROLLING THE SAME

(75) Inventor: Jaeseok Ho, Seoul (KR)

(73) Assignee: LG Electronics Inc., Seoul (KR)

( * ) Notice: Subject to any disclaimer, the term of this patent is extended or adjusted under 35 U.S.C. 154(b) by 303 days.

(21) Appl. No.: 13/565,320

(22) Filed: Aug. 2, 2012

(65) Prior Publication Data

US 2013/0176377 A1  Jul. 11, 2013

(30) Foreign Application Priority Data

Jan. 6, 2012  (KR) .................. 10-2012-0002206

(51) Int. Cl.
  *H04N 7/14*  (2006.01)
  *H04M 3/42*  (2006.01)
(52) U.S. Cl.
  USPC .............. 348/14.01; 348/14.03; 348/14.07; 455/414.1; 455/566
(58) Field of Classification Search
  CPC ............. H04M 2201/40; H04M 2250/74; H04M 3/4936; H04M 3/5191; H04M 1/656; H04M 1/72522; H04M 1/72566; H04M 2250/22; H04N 7/14; H04N 7/141; H04N 7/142; H04N 7/144; H04N 7/147; H04N 7/148; H04N 7/15; H04N 7/152; H04N 7/155; H04N 7/157
  USPC ........ 379/265.03; 455/414.1, 566; 704/270.1; 348/14.01, 14.02, 14.03, 14.04, 14.05, 348/14.06, 14.07, 14.08, 14.09, 14.1, 14.11, 348/14.12, 14.13, 14.14, 15.15, 14.16
  See application file for complete search history.

(56) References Cited

U.S. PATENT DOCUMENTS

| | | | |
|---|---|---|---|
| 2007/0073718 A1* | 3/2007 | Ramer et al. ................. | 707/10 |
| 2007/0121814 A1* | 5/2007 | Creighton et al. .......... | 379/88.01 |
| 2007/0179778 A1* | 8/2007 | Gong et al. ................. | 704/9 |
| 2010/0069123 A1* | 3/2010 | Araradian et al. ........... | 455/566 |
| 2011/0069024 A1* | 3/2011 | Kim ............................ | 345/173 |
| 2011/0202874 A1* | 8/2011 | Ramer et al. ................ | 715/810 |
| 2011/0206198 A1* | 8/2011 | Freedman et al. ........ | 379/265.03 |
| 2012/0035931 A1* | 2/2012 | LeBeau et al. .............. | 704/251 |
| 2013/0095805 A1* | 4/2013 | LeBeau et al. ............ | 455/414.1 |
| 2014/0052452 A1* | 2/2014 | Koivuniemi et al. ...... | 704/275 |
| 2014/0153705 A1* | 6/2014 | Moore et al. ............... | 379/88.14 |
| 2014/0195244 A1* | 7/2014 | Cha et al. .................. | 704/270.1 |

FOREIGN PATENT DOCUMENTS

| | | | | |
|---|---|---|---|---|
| EP | 2114058 A2 | 11/2009 | | |
| EP | 2146491 A1 | 1/2010 | | |
| EP | 2146491 A1 * | 1/2010 | ............ | H04M 1/725 |

* cited by examiner

*Primary Examiner* — Khai N Nguyen
(74) *Attorney, Agent, or Firm* — Birch, Stewart, Kolasch & Birch, LLP

(57) ABSTRACT

A mobile terminal including a speech recognition unit configured to recognize input speech; a mobile communication unit configured to perform a calling operation with at least one other terminal; and a controller configured to receive a predetermined input while performing the calling operation, to recognize voice call contents through the speech recognition unit based on the received predetermined input, to tag the recognized voice call contents to at least one application executed by the mobile terminal, and to execute the at least one application using the tagged voice call contents.

20 Claims, 44 Drawing Sheets

| Indicator Area |||||||
|---|---|---|---|---|---|---|
| Calendar |||||||
| 2012 |||||||
| [2011 12] | | 12 01 SD | | | | [2012 02] |
| Sun | Mon | Tue | Wed | Thu | Fri | Sat |
| | 1 | 2 | 🎤 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | | | |

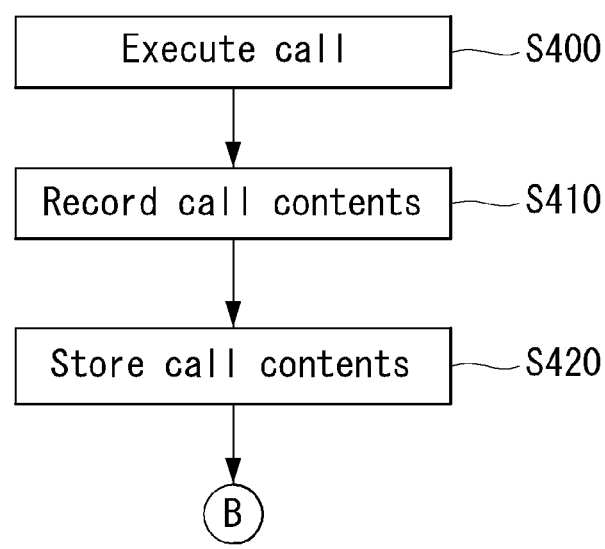

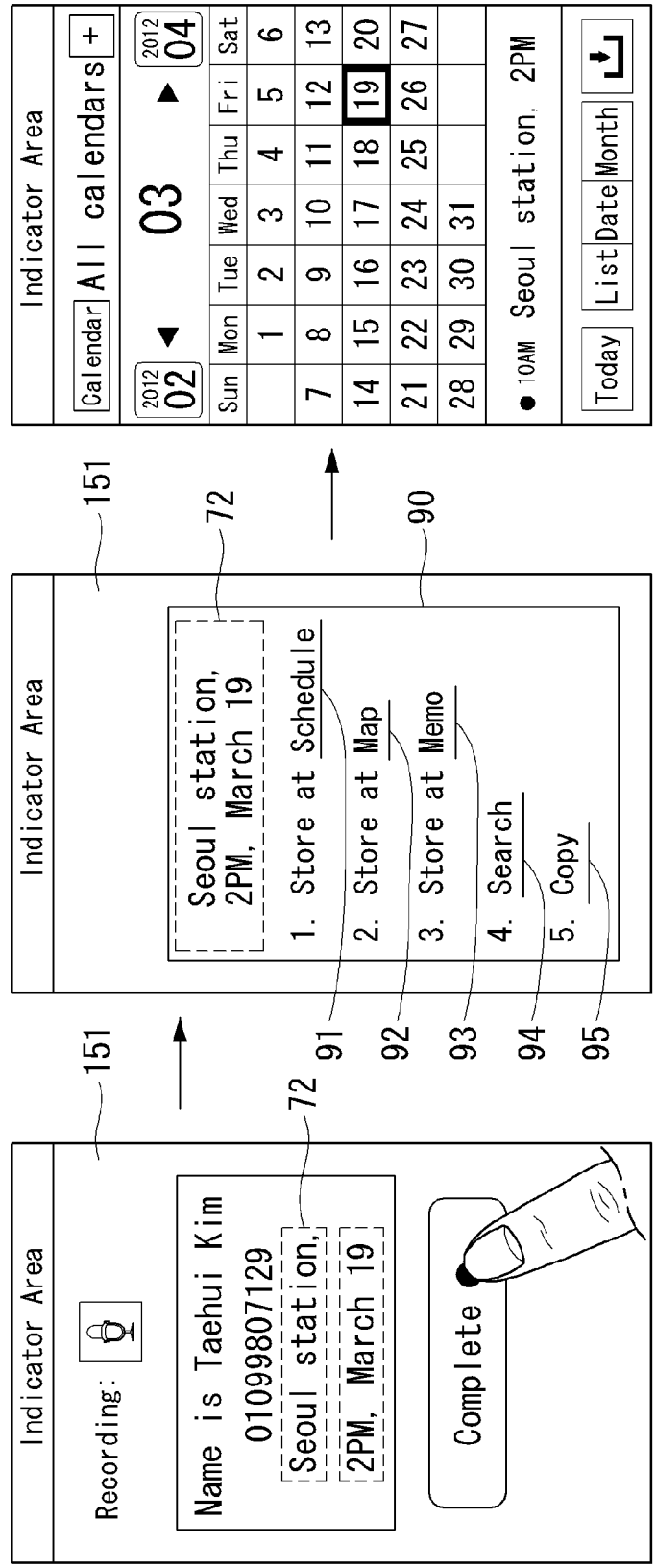

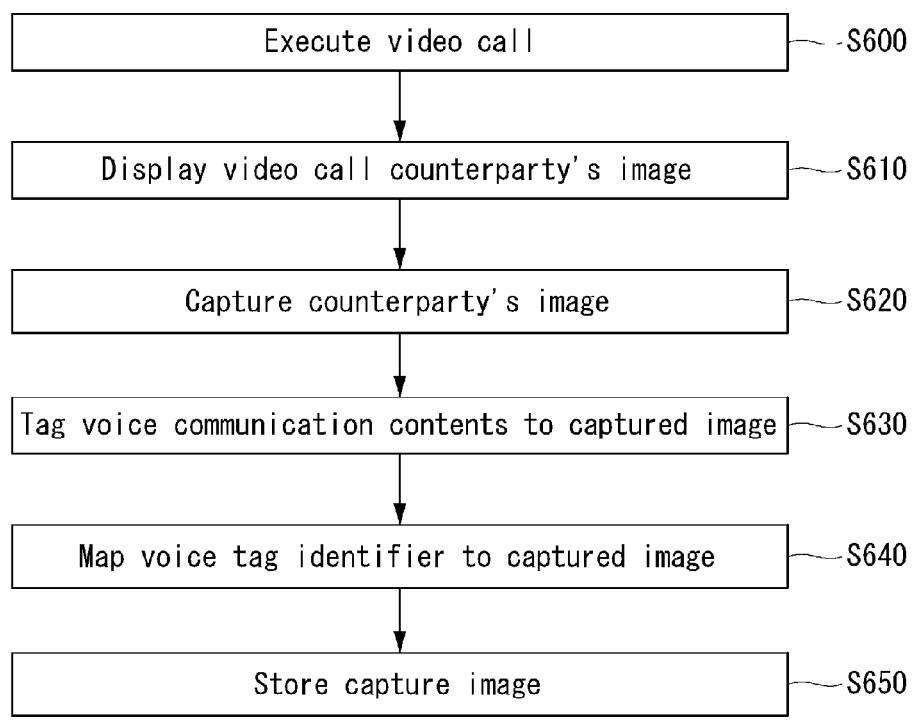

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Patent Application No. 10-2012-0002206, filed on Jan. 6, 2012, the contents of which are hereby incorporated by reference herein in its entirety.

FIELD OF THE INVENTION

The present invention relates to a mobile terminal and a method of controlling the same.

RELATED ART

Terminals such as a personal computer (PC), a laptop computer, and a mobile terminal are formed to perform various functions, for example, a data and voice communication function, a function of photographing a picture or a moving picture through a camera, a function of storing a voice, a function of reproducing a music file through a speaker system, and a function of displaying an image or video. Some terminals include an addition function that can execute a game, and some other terminals may be embodied as a multimedia device. Moreover, a recent terminal enables to view video or a television program by receiving broadcasting or a multicast signal.

In general, terminals are classified into a mobile terminal and a stationary terminal according to mobility, and mobile terminals are again classified into a handheld terminal and a vehicle mount terminal according to whether a user can directly carry.

Efforts for supporting and enlarging a function of a terminal have been continuously performed, and such effort includes improvement of software or hardware as well as a change and improvement of structural constituent elements that form a terminal.

SUMMARY OF THE INVENTION

An aspect of the present invention is to provide a mobile terminal and a method of controlling the same that can control execution of an item related to voice call contents based on voice call contents acquired through speech recognition while performing call.

Another aspect of the present invention is to provide a mobile terminal and a method of controlling the same that can more conveniently acquire desired data through a predetermined item while performing call by recognizing a speaker's speech while performing call and tagging the recognized speech to the predetermined item.

Another aspect of the present invention is to provide a mobile terminal and a method of controlling the same that can more conveniently acquire desired data by linking at least one item that can interlock with a speech recognition function to communication contents while performing call.

Another aspect of the present invention is to provide a mobile terminal and a method of controlling the same that can more efficiently perform multicasting through speech recognition while performing call.

In an aspect, a mobile terminal includes: a speech recognition unit; a mobile communication unit for performing at least one of voice call and video call; and a controller for recognizing voice call contents through the speech recognition unit according to a predetermined input while performing the call and for tagging the voice call contents to at least one item, and for controlling execution of the item according to the tagged voice call contents.

In another aspect, a mobile terminal includes: a mobile communication unit; a camera; a microphone; and a controller for acquiring a sound signal through the microphone while performing video call with at least one external device through the mobile communication unit and the camera, for executing a voice search through a predetermined voice search application based on the acquired sound signal, and for storing a voice search result.

In another aspect, a method of controlling a mobile terminal includes: performing at least one of voice call and video call; recognizing voice call contents through a speech recognition unit when a predetermined input is received while performing the call; tagging the voice call contents to at least one item; and controlling execution of the item according to the tagged voice call contents.

In another aspect, a method of controlling a mobile terminal includes: performing video call; recording voice call contents while performing the video call; executing a voice search application as a predetermined input is received; extracting a search word from the recorded voice call contents; executing a voice search in the voice search application based on the extracted search word; and storing a voice search result.

The detailed matters of the embodiments will be included in the detailed description and the drawings.

A mobile terminal and a method of controlling the same according to an embodiment of the present invention have the following effects.

According to an embodiment of the present invention, execution of an item related to voice call contents can be controlled based on the voice call contents acquired through speech recognition while performing call.

Further, according to an embodiment of the present invention, by recognizing a speaker's speech while performing call and tagging the recognized speech to a predetermined item, while performing the call, desired data can be more conveniently acquired through the item.

Further, according to an embodiment of the present invention, while performing call, by linking at least one item that can interlock with a speech recognition function to communication contents, desired data can be more conveniently acquired.

Further, according to an embodiment of the present invention, more efficient multicasting can be performed through speech recognition while performing call.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

Figure 15B:
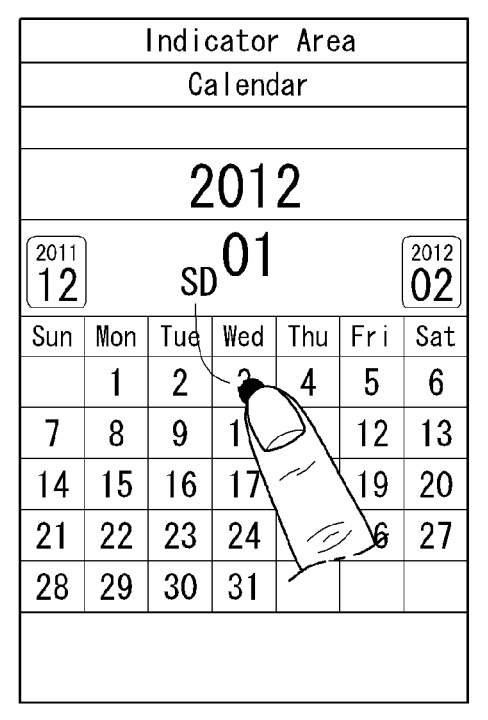

FIGS. 13a and 13b, 14a and 14b, and 15a to 15d are diagrams illustrating an embodiment shown in FIG. 12.

FIG. 16 is a flowchart illustrating a method of controlling a mobile terminal according to an embodiment of the present invention.

FIGS. 20a to 20d are diagrams illustrating an embodiment shown in FIG. 19.

FIG. 26 is a flowchart illustrating a method of controlling a mobile terminal according to an embodiment of the present invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
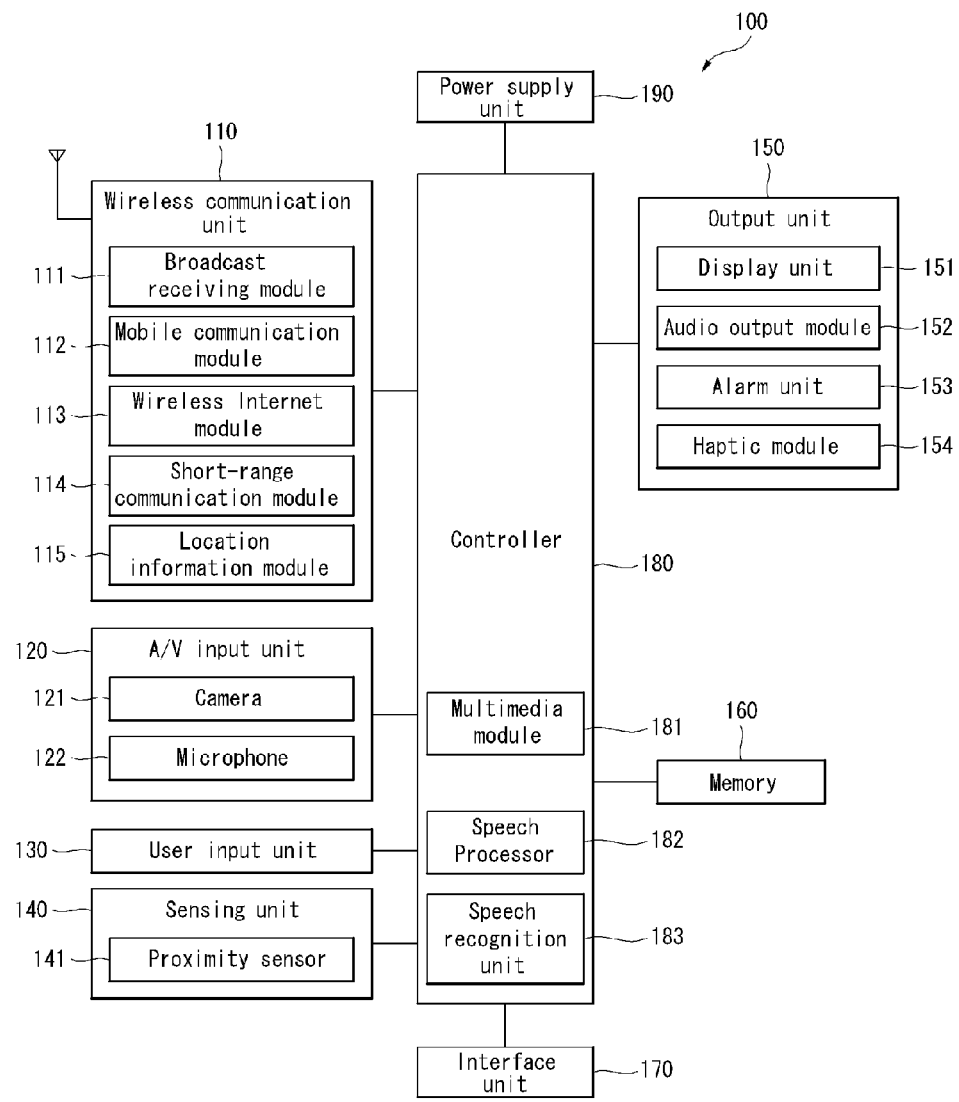
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but implementing all of the illustrated components is not a requirement. Greater or fewer components may alternatively be implemented.

In addition, the wireless communication unit 110 generally includes one or more components allowing radio communication between the mobile terminal 100 and a wireless communication system or a network in which the mobile terminal is located. For example, in FIG. 1, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broad cast associated information from an external broadcast management server via a broadcast channel. Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems. In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

Also, the location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the wireless communication unit 110. Two or more cameras 121 may also be provided according to the configuration of the mobile terminal.

In addition, the microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates command or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. In FIG. 1, the sensing unit 140 also includes a proximity sensor 141.

In addition, the output unit 150 is configured to provide outputs in a visual, audible, and/or tactile manner. In the example in FIG. 1, the output unit 150 includes the display unit 151, an audio output module 152, an alarm unit 153, a haptic module 154, and the like. In more detail, the display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a touch sensor', hereinafter) for detecting a touch operation are overlaid in a layered manner to form a touch screen, the display unit 151 can function as both an input device and an output device. The touch sensor may have a form of a touch film, a touch sheet, a touch pad, and the like.

Further, the touch sensor may be configured to convert pressure applied to a particular portion of the display unit 151 or a change in the capacitance or the like generated at a particular portion of the display unit 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 1, the proximity sensor 141 may be disposed within or near the touch screen. In more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

Further, the audio output module 152 can convert and output as sound and data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

In addition, the haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181 may be configured within the controller 180 or may be configured to be separated from the controller 180. The controller 180 can also perform a pattern recognition processing to recognize a handwriting input or a picture drawing input performed on the touch screen as characters or images, respectively.

Further, the controller 180 performs a control and processing related to a voice output. The controller 180 may further include a speech recognition unit 182 for performing speech recognition from speech transferred from a speaker, a speech processor 183 for converting a sound signal to a text signal, a voice synthesis unit, a sound source direction search module, and a distance measurement unit for measuring a distance to a sound source.

The speech recognition unit 182 performs speech recognition of a sound signal input through the microphone 122 of the mobile terminal 100 and acquires at least one recognition candidate corresponding to the recognized speech. For example, the speech recognition unit 182 detects a speech segment from the input sound signal, performs sound analysis, recognizes the sound segment in a recognition unit, and recognizes the input sound signal. The speech recognition unit 182 acquires at least one recognition candidate corresponding to a recognized result of speech with reference to a recognition dictionary and a translation database stored at the memory 160.

The speech processor 183 performs a processing of receiving a sound signal from a user through the microphone 122, recognizing the sound signal, and converting the sound signal to a text signal. The speech processor 183 converts a sound signal to a text (or a message) using a sound to text (STT) function. Here, when a sound signal is input, the STT function is a function of converting the input sound signal to a text. In order to perform such an STT function, the controller 180 is connected to the speech recognition unit 182.

The voice synthesis unit converts a text to speech using a text-to-speech (TTS) engine. TTS technology is technology that converts and tells text information or a symbol to a human's speech. TTS technology constructs a pronunciation database for all phonemes of language, generates continuous speech by connecting to the pronunciation database, synthesizes natural speech by adjusting a magnitude, a length, and high and low of speech, and may include natural language processing technology for this purpose. TTS technology may be easily seen in an electronic community field such as CTI, a PC, a PDA, and a mobile terminal and an electronic field such as a recorder, a toy, and a game player and contributes to improvement of productivity in a factory or is widely used in a home automation system for a more convenient daily life. Because TTS technology is well-known technology, a more detailed description will be omitted.

Also, the power supply unit 190 receives external power or internal power and supplies appropriate power required for operating respective elements and components under the control of the controller 180. Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
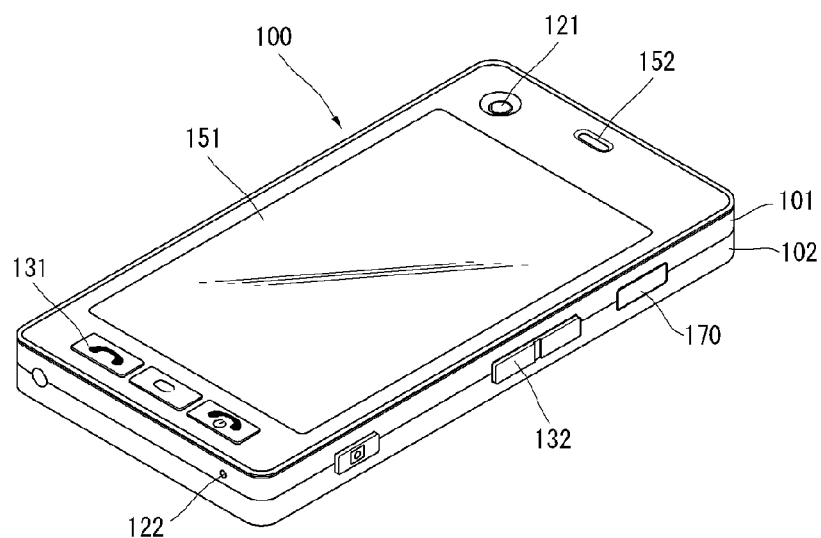
FIG. 2a is a front perspective view of a mobile terminal or a handheld terminal according to an embodiment of the present invention.

FIG. 2a is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 131 and 132 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
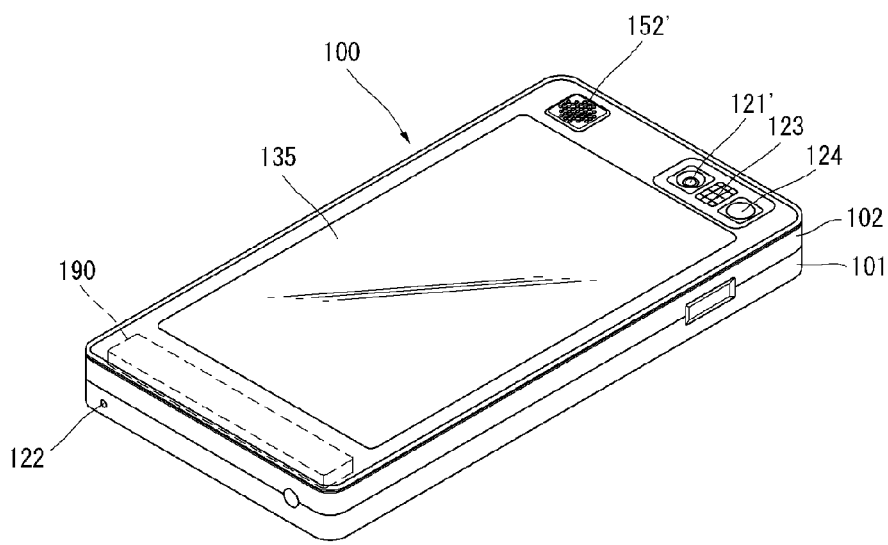
FIG. 2b is a rear perspective view of the handheld terminal shown in FIG. 2a according to an embodiment of the present invention.

FIG. 2b is a rear perspective view of the handheld terminal shown in FIG. 2a according to an embodiment of the present invention.

Referring to FIG. 2b, a camera 121' can be additionally attached to the rear side of the terminal body, that is, the rear case 102. The camera 121' has a photographing direction opposite to that of the camera 121 shown in FIG. 2a and can have pixels different from those of the camera 121 shown in FIG. 2a.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' take a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2a and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Hereinafter, embodiments of the present invention will be described. In the present invention, for convenience of description, it is assumed that the display unit 151 is the touch screen 151. As described above, the touch screen 151 can perform both an information display function and an information input function. However, the present invention is not limited thereto. Further, a touch described in this document may include both a contact touch and a proximity touch.

Figure 3:
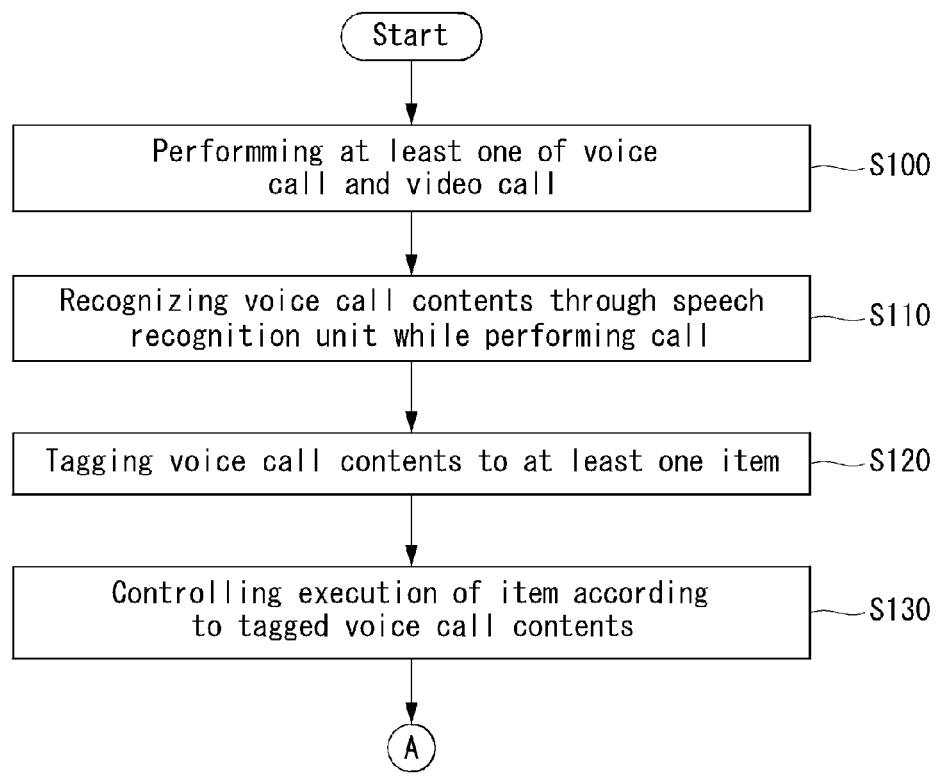
FIG. 3 is a flowchart illustrating a method of controlling a mobile terminal according to an embodiment of the present invention.
Figure 4:
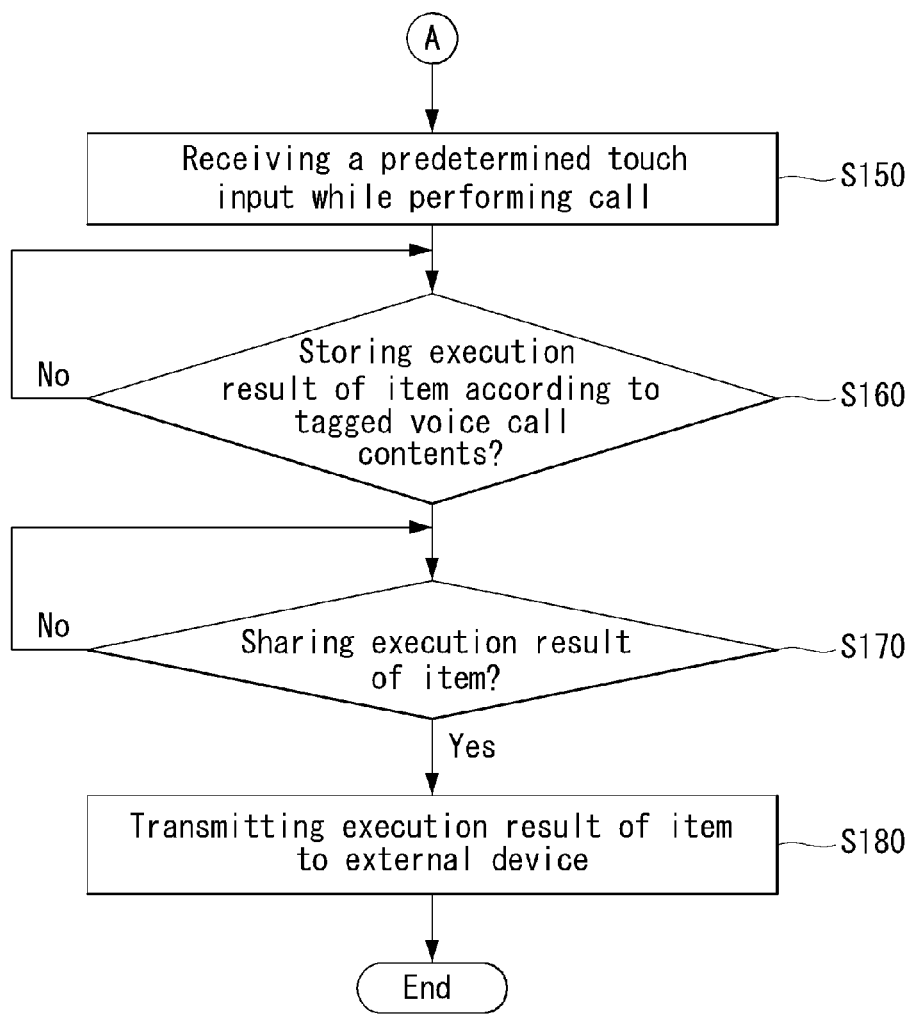
FIG. 4 is a flowchart illustrating an example of sharing an item execution result acquired through an embodiment shown in FIG. 3 with an external device.

FIG. 3 is a flowchart illustrating a method of controlling a mobile terminal according to an embodiment of the present invention, and FIG. 4 is a flowchart illustrating an example of sharing an item execution result acquired through an embodiment shown in FIG. 3 with an external device. FIGS. 5a to 5d are diagrams illustrating an embodiment shown in FIGS. 3 and 4.

A method of controlling a mobile terminal according to an embodiment of the present invention can be performed in the mobile terminal 100 described with reference to FIGS. 1, 2a, and 2b. Hereinafter, a method of controlling a mobile terminal according to an embodiment of the present invention and operation of the mobile terminal 100 for performing the method will be described in detail with reference to necessary drawings.

Referring to FIG. 3, the controller 180 performs at least one of a voice call and video call (S100). The controller 180 transmits and receives a voice call signal or a video call signal to and from an external device through the mobile communication module 112 and thus performs the voice call or video call.

The controller 180 recognizes voice call contents through a speech recognition unit while performing the call (S110). For example, when a predetermined input is received while performing a voice call or video call, the controller 180 activates the microphone 122 and recognizes speech of a speaker. As described above, the controller 180 may separately include the speech recognition unit 182 or the speech processor 183.

When a video call is performed, the controller 180 transmits an image of a user through the camera 121 to another party side (counterparty) and displays another party's image on the touch screen 151. Therefore, while performing video call, the predetermined input may include a touch input to one area of the touch screen 151 in which another party's image is displayed. That is, while performing the video call, when a touch input to the touch screen 151 is received, the controller 180 controls to simultaneously perform a video call mode and a speech recognition mode.

When performing a voice call, the controller 180 enters a speech recognition mode that can recognize communication contents through an outside input, for example, a hard key input provided in a body of the mobile terminal 100, as shown in FIGS. 2a and 2b.

The controller 180 recognizes voice call contents in the speech recognition mode and recognizes all speeches or a specific voice command in which a user speaks.

The controller 180 tags the voice call contents to at least one item (S120). Here, the item may include at least one application that can interlock with a voice search function. The application that can interlock with a voice search function is an application that can recognize a speaker's voice command while executing an application and that can control operation according to the recognized voice command. For example, at least one application that can interlock with the voice search function may include at least one of web browser, phonebook, map, e-book, and calendar applications.

Thereafter, when the voice call contents are tagged to a predetermined item, the controller 180 controls execution of the item according to the tagged voice call contents (S130). Thus, when the voice call contents are tagged to a specific item, speech based on the voice call contents may be used for executing an intrinsic function of the specific item.

For example, when the specific item is a web browser, while performing a video call through the mobile terminal 100, as the mobile terminal 100 enters a speech recognition mode, the controller 180 recognizes predetermined speech in which a speaker speaks through a speech recognition unit, extracts a search word from the recognized speech, and performs a search based on the search word through the web browser.

In another example, when the specific item is a map application, a position of predetermined position information recognized while performing call may be determined through the map application. In still another example, when the specific item is an electronic dictionary, a meaning of a predetermined word recognized while performing a call may be determined through the electronic dictionary.

In an embodiment of the present invention, a speech recognition mode is activated while performing call, and predetermined voice call contents recognized in the speech recognition mode may be applied to at least one application that can interlock with the voice search function.

The item is not limited to an application that can interlock with a voice search function. For example, the item may include at least one application that can execute based on input text information. For example, the item may include an application that is not interlocked with a voice search function, but that converts a sound signal recognized through a speech recognition unit to a text and that controls execution of an item based on the converted text.

The mobile terminal 100 according to an embodiment of the present invention can share a control result of execution of a predetermined item through speech recognition while performing the call with an external device.

Referring to FIG. 4, the controller 180 controls execution of a specific item through speech recognition while performing a call and then continues to perform the communication regardless of execution control of the specific item.

Therefore, when a predetermined touch input to the touch screen 151 is received while performing the call (S150), the controller 180 determines whether to store an item execution result according to the tagged voice call contents (S160). The predetermined touch input may be a long touch input to the touch screen 151 for displaying an item execution screen based on the voice call contents.

If an input of storing the item execution result is received, the controller 180 determines whether to share the item execution result with an external device (S170). If the item execution result is shared with an external device, the controller 180 transmits the item execution result to the external device (S180).

Figure 5A:
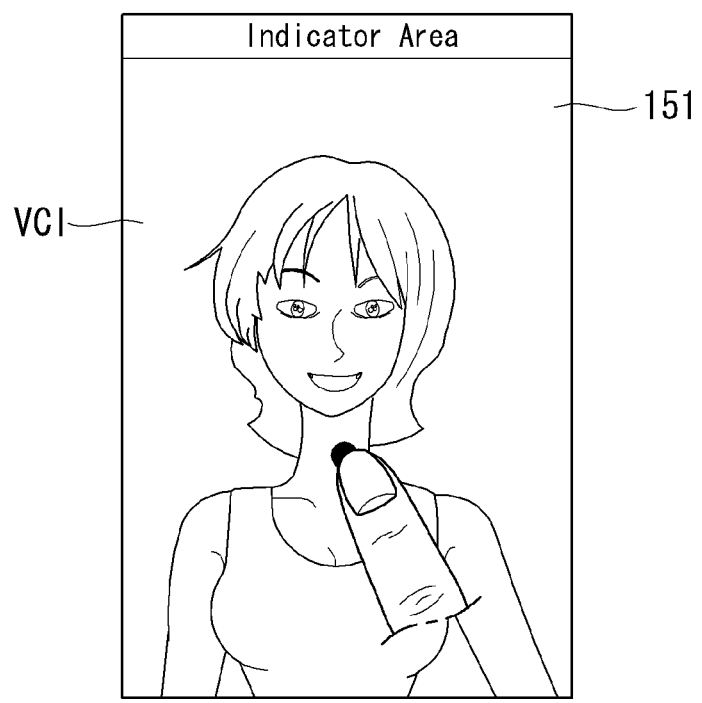
FIGS. 5a to 5d are diagrams illustrating an embodiment shown in FIGS. 3 and 4.
Figure 5B:
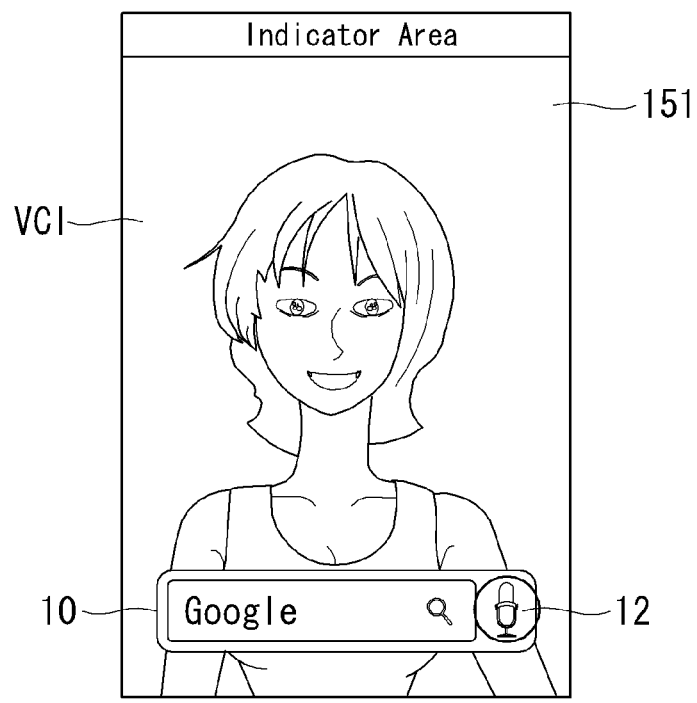

Next, FIGS. 5a to 5b are diagrams illustrating examples of S100, S110, and S120 of FIG. 3. Referring to FIG. 5a, the controller 180 displays another party's image VCI while performing a video call on the touch screen 151. Thereafter, when a predetermined touch input to the touch screen 151 is received, the controller 180 enters a speech recognition mode that can recognize voice call contents according to video call. Here, a predetermined touch input may be a single touch input to the touch screen 151.

Referring to FIG. 5b, in the speech recognition mode, the controller 180 displays an identifier for identifying a predetermined voice search engine on the touch screen 151. For example, as the predetermined voice search engine, a GOOGLE search engine 10 may be used, and the controller 180 displays an identification display 12 that can represent a voice command input and a speech recognition mode on the touch screen 151.

Figure 5C:
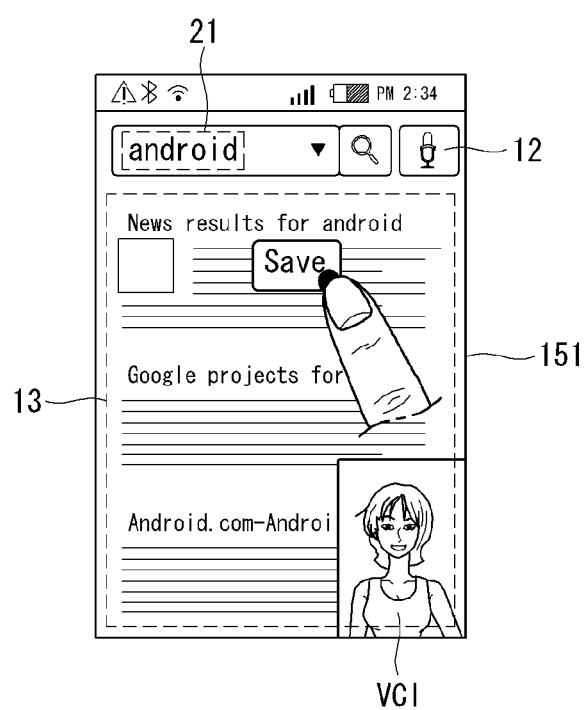
Figure 5D:
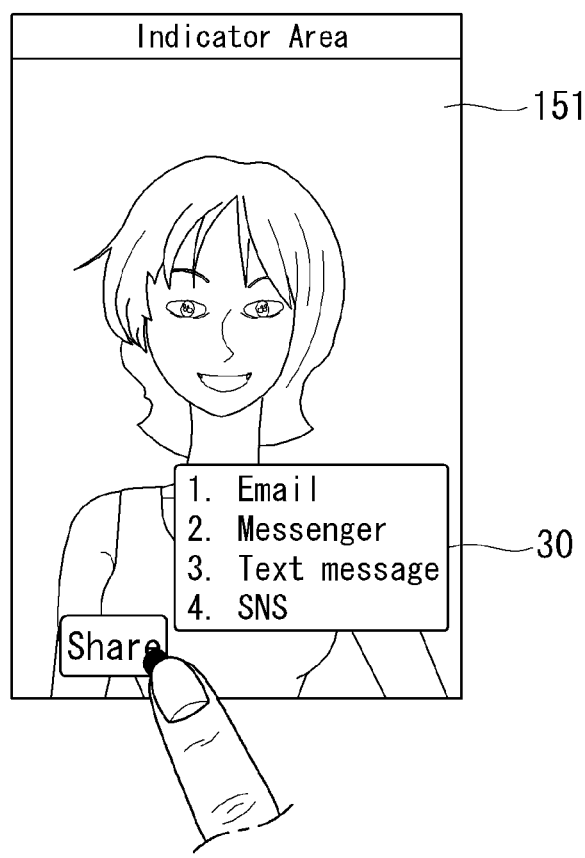

FIGS. 5c to 5d are diagrams illustrating an embodiment shown in FIG. 4. Referring to FIG. 5c, in the speech recognition mode, when a speaker's speech, for example, "android" 21 is recognized, the controller 180 tags the recognized speech to a web page (e.g., Google search engine).

The controller 180 displays a search result 13 of the input speech "android" 21, which is the voice call contents, within the web page on the touch screen 151. The controller 180 may display the search result 13 together with the other party's (counterparty's) image VCI of video call on the touch screen 151. When a long touch input to the search result 13 is received, the controller 180 stores the search result 13 in the memory 160.

Referring to FIG. 5d, the controller 180 uses the recognized speech while performing the video call as a search word of a predetermined web page and shares a search result with an external device. For example, the controller 180 may transmit the search result 13 shown in FIG. 5c through at least one application (e.g., an e-mail, a messenger, a text message, and an SNS).

For this, when a predetermined touch input to the touch screen 151 is received, the controller 180 displays a menu 30 for selecting the at least one application.

Hereinafter, exemplary embodiments of recognizing predetermined speech while performing a call and applying the recognized speech to a process of executing at least one item will be described.

Figure 6:
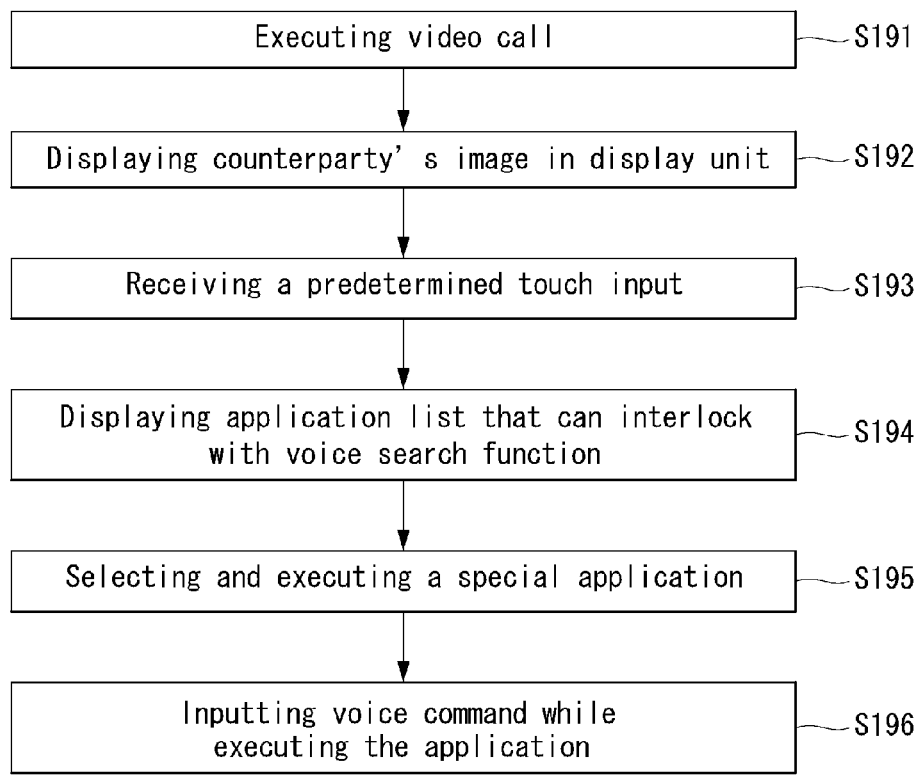
FIG. 6 is a flowchart illustrating a method of controlling a mobile terminal according to an embodiment of the present invention.
Figure 7A:
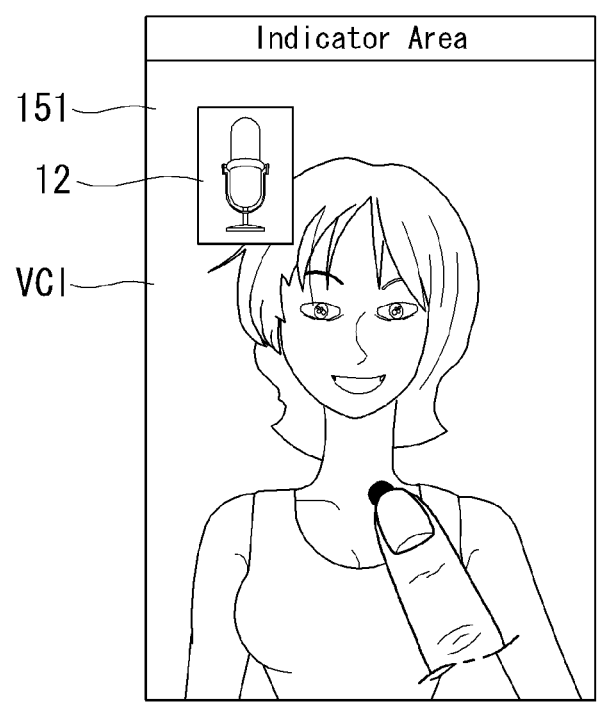
FIGS. 7a and 7b are diagrams illustrating an embodiment shown in FIG. 6.
Figure 7B:
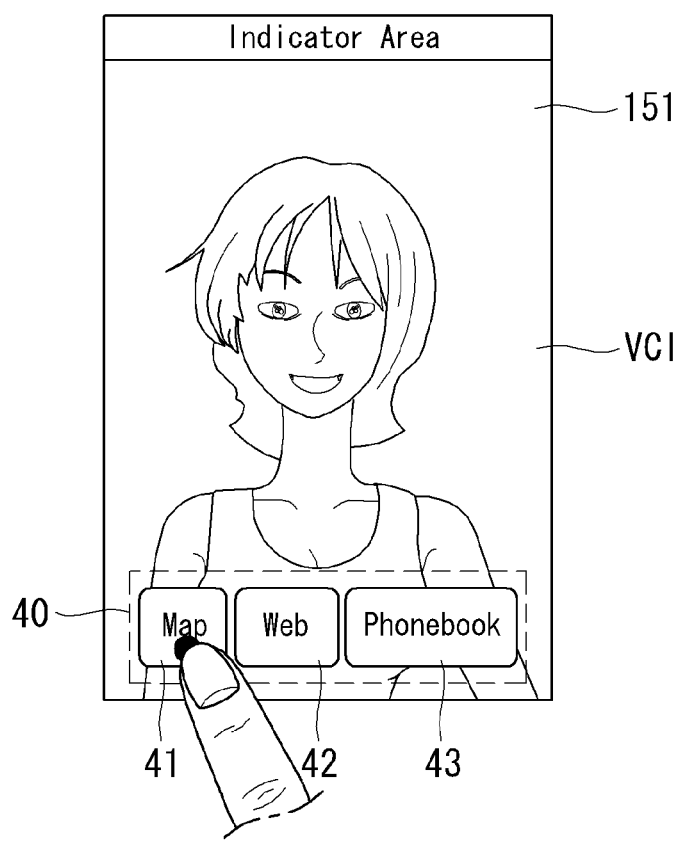

FIG. 6 is a flowchart illustrating a method of controlling a mobile terminal according to an embodiment of the present invention. FIGS. 7a to 7b are diagrams illustrating an embodiment shown in FIG. 6.

A method of controlling a mobile terminal according to an embodiment of the present invention can be performed in the mobile terminal 100 described with reference to FIGS. 1, 2a and 2b. Hereinafter, a method of controlling a mobile terminal according to an embodiment of the present invention and operation of the mobile terminal 100 for embodying the method will be described in detail with reference to necessary drawings. An embodiment according to the present invention to be described later may be performed in the embodiment described with reference to FIGS. 3 and 4.

Referring to FIG. 6, the controller 180 executes a video call through the camera 121 and the mobile communication module 112 (S191). When the video call is executed, the controller 180 displays another party's image VCI on the touch screen 151 (S192) (see FIG. 7a).

Further, while executing the video call, the mobile terminal 100 enters a speech recognition mode and displays the identifier 12 notifying a speech recognition mode together with the other party's image VCI on the touch screen 151 (see FIG. 7a).

When a predetermined touch input (e.g., a single touch input) to the touch screen 151 is received (S193), the controller 180 displays an application list 40 that can interlock with a voice search function on the touch screen 151 (S194). Referring to FIG. 7b, for example, the controller 180 displays an application list 40 including a map application 41, a web browser application 42, and a phonebook application 43 on the touch screen 151.

Thereafter, when a specific application is selected from the application list 40, the controller 180 executes the selected application (S195). Here, the controller 180 may execute the video call and the selected application in parallel in a multi-task form instead of terminating an already performing video call.

The controller 180 receives an input of recognized voice call contents in the video call while executing the selected application (S196). That is, in the foregoing embodiment, an example of recognizing communication contents through a speech recognition process while performing call and applying the recognized communication contents to a predetermined application has been described.

Figure 8:
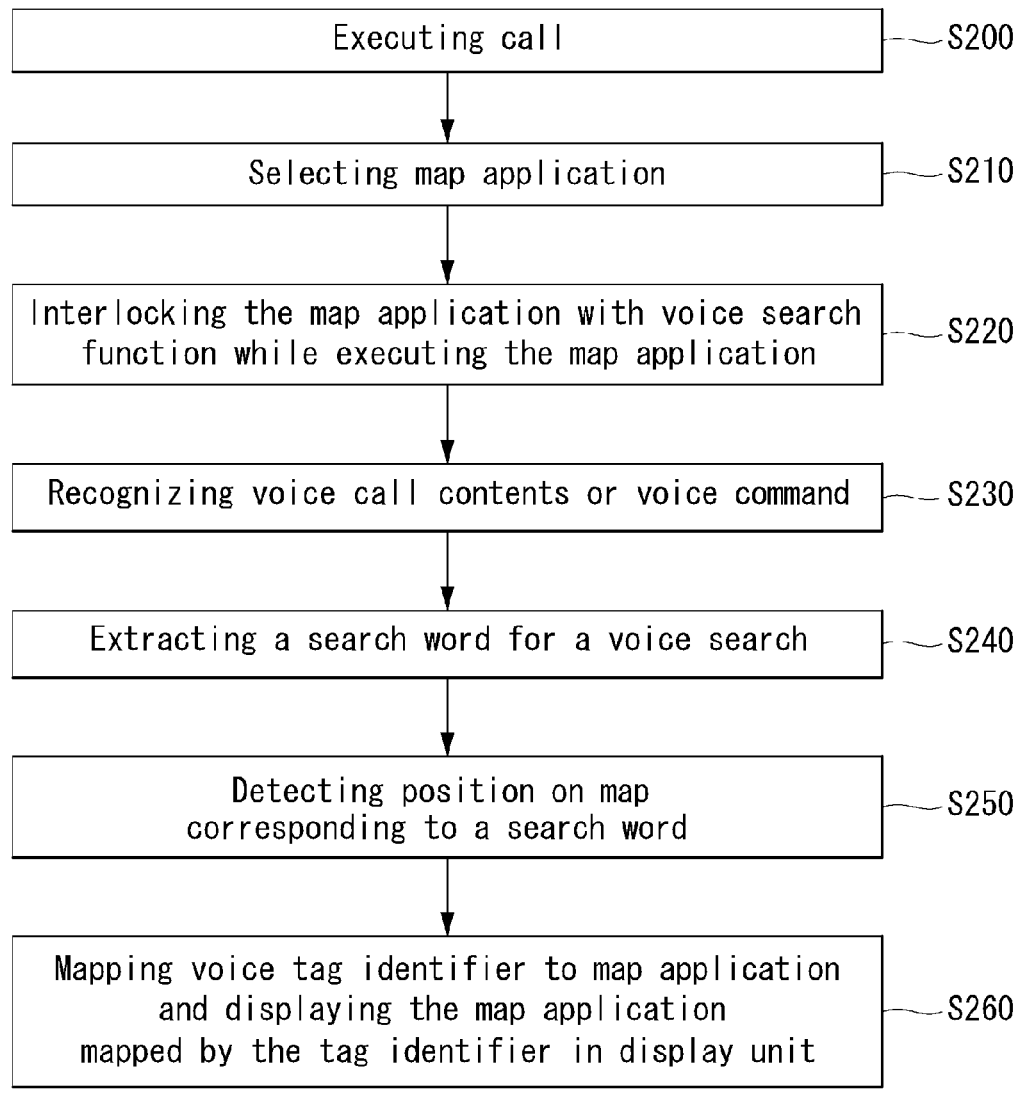
FIG. 8 is a flowchart illustrating a method of controlling a mobile terminal according to an embodiment of the present invention.
Figure 9:
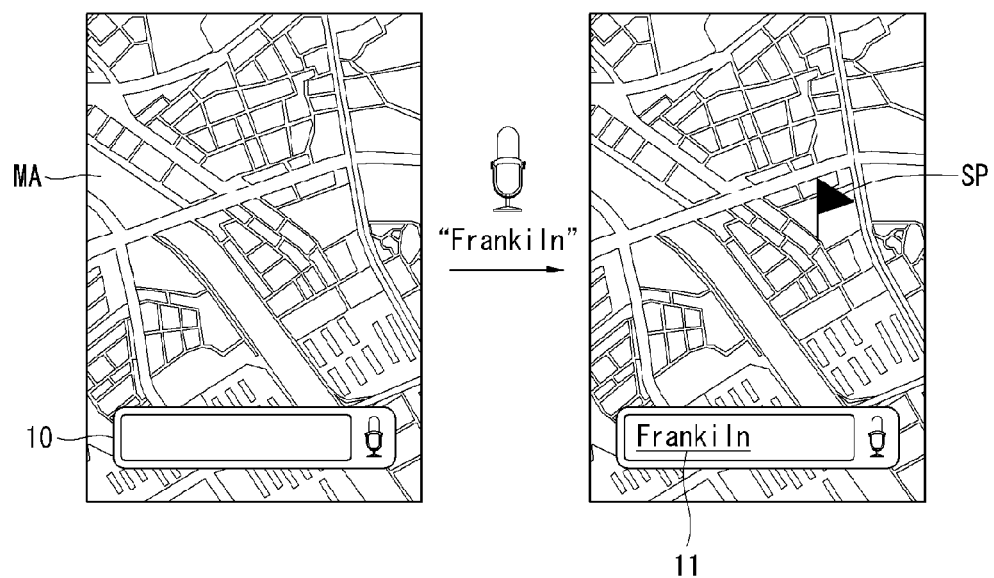
FIGS. 9 to 11 are diagrams illustrating an embodiment shown in FIG. 8.
Figure 10:
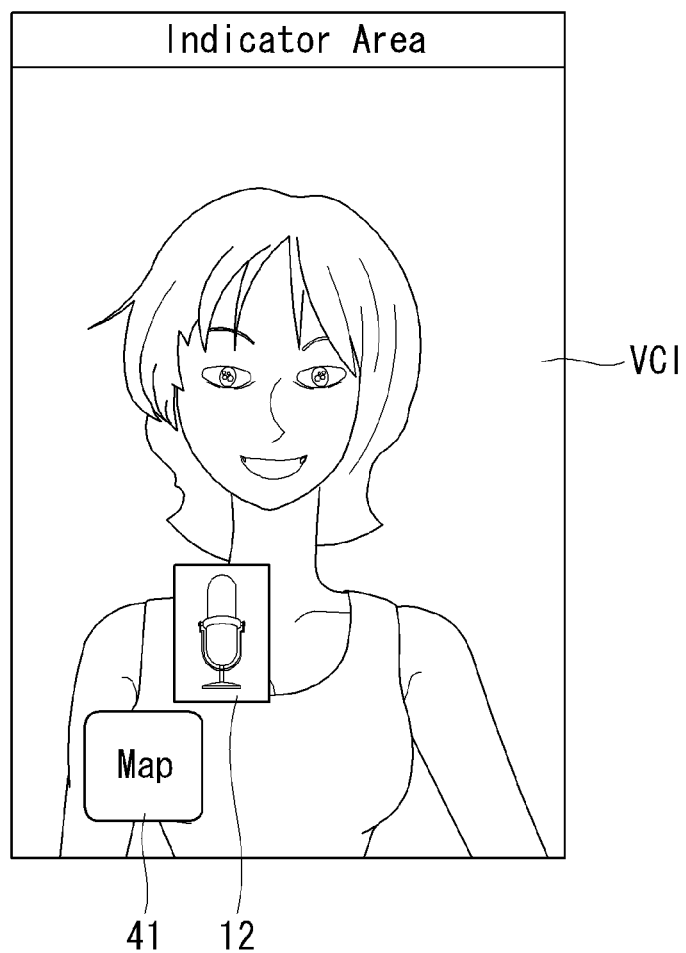
Figure 11:
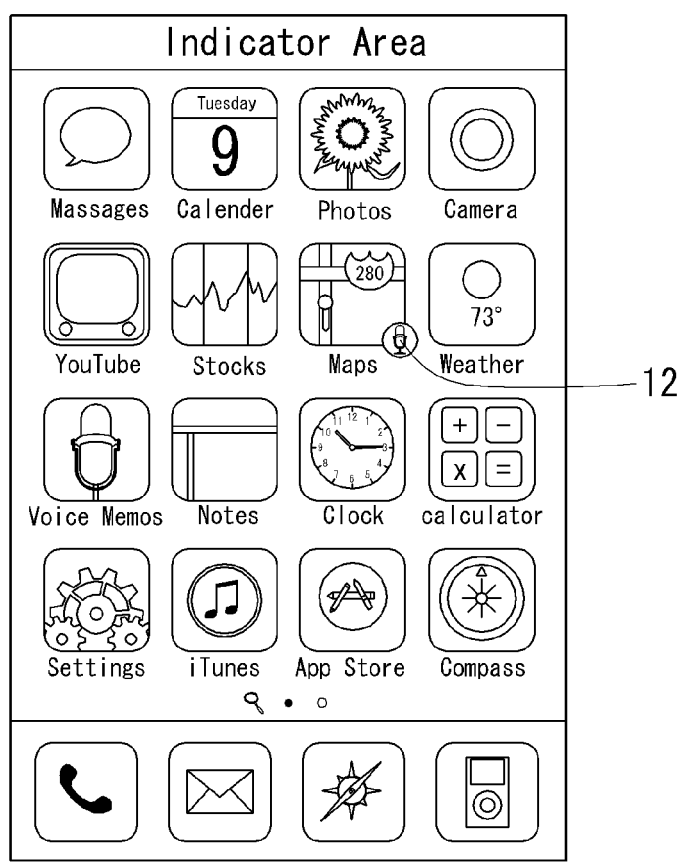

Hereinafter, the application example will be described in detail. FIG. 8 is a flowchart illustrating a method of controlling a mobile terminal according to an embodiment of the present invention, and FIGS. 9 to 11 are diagrams illustrating an embodiment shown in FIG. 8. The control method may be performed by the control of the controller 180. An embodiment described hereinafter may be performed with reference to the foregoing embodiments.

Referring to FIG. 8, the controller 180 executes one of a video call and voice call (S200). The controller 180 selects a map application from the application list 40 that can interlock with the voice search function shown in FIG. 7b (S210).

Referring to FIG. 9, the controller 180 interlocks a map application (MA) with a voice search function while executing an MA (S220). Accordingly, the controller 180 displays an area 10 for a voice search on the touch screen 151. Thereafter, the controller 180 receives an input of voice call contents or a voice command while executing communication and performs speech recognition (S230). After speech recognition, the controller 180 extracts a search word for a voice search (S240). Here, the search word may include a position related keyword included in the voice call contents or the voice command.

The controller 180 detects a position on a map corresponding to the search word (S250). For example, referring to FIG. 9, when the position related keyword is "Franklin" 11, the controller 180 tags position information "Franklin" 11 to the map application MA, and the map application MA searches for the position information "Franklin" 11 on a map and displays a corresponding position SP on the map.

The controller 180 stores a search result of a specific position while executing the map application. When the mobile terminal 100 is in a communication state or when communication through the mobile terminal 100 is terminated, the controller 180 displays the search result on the touch screen 151.

That is, the controller 180 maps a voice tag identifier to a map application and displays the voice tag identifier on the touch screen 151 (S260). For example, when communication is being performed, referring to FIG. 10, the controller 180 maps the voice tag identifier 12 representing that predetermined communication contents to a map application icon 41 and displays the voice tag identifier 12 together with the other party's image VCI on the touch screen 151.

In another example, when communication is terminated, referring to FIG. 11, the controller 180 maps the voice tag identifier 12 to the map application icon 41 and displays the voice tag identifier 12 on the touch screen 151.

An application in which recognized speech is to be interlocked while performing call may be preset by a user. For example, an application to be interlocked while performing video call may be previously executed before performing video call.

Figure 12:
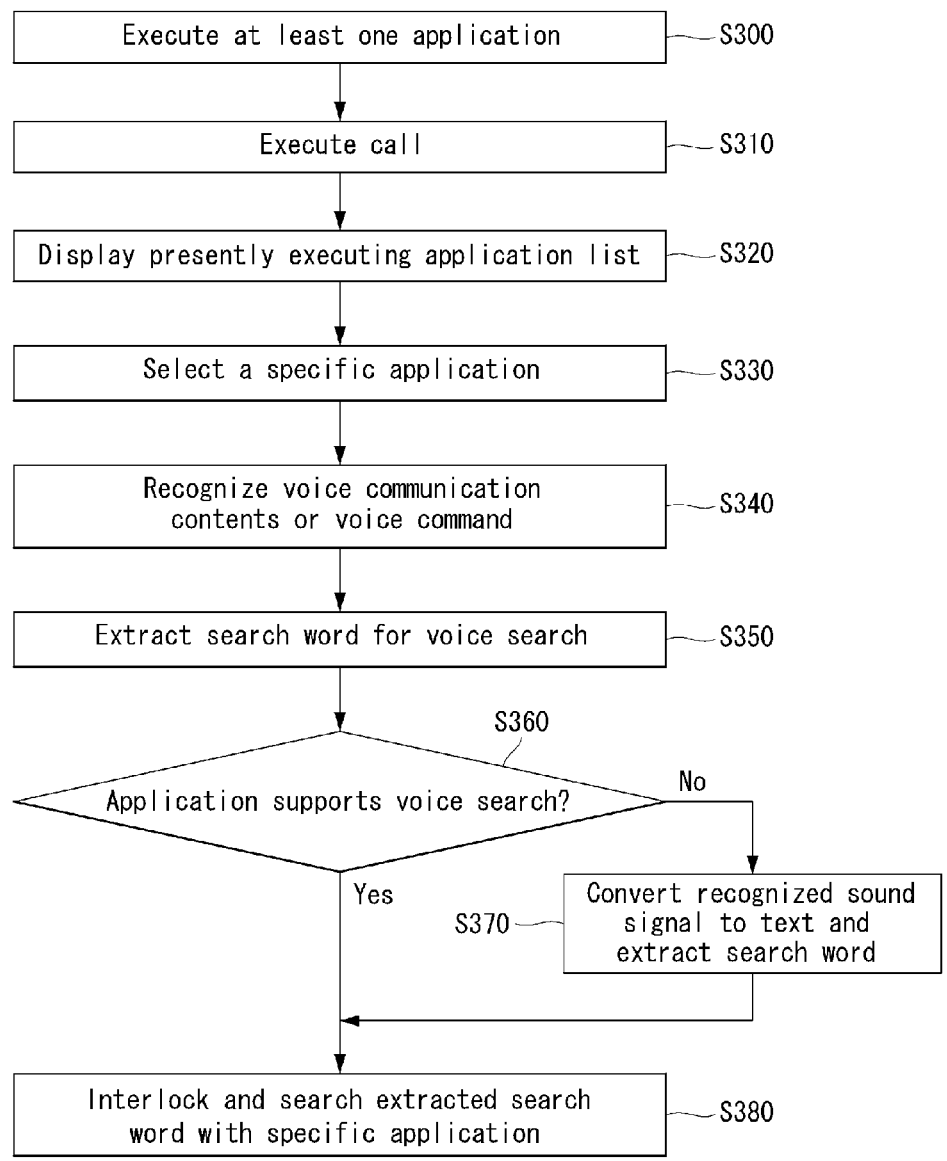
FIG. 12 is a flowchart illustrating a method of controlling a mobile terminal according to an embodiment of the present invention.

FIG. 12 is a flowchart illustrating a method of controlling a mobile terminal according to an embodiment of the present invention. The control method may be executed by the control of the controller 180. Referring to FIG. 12, the controller 180 executes at least one application (S300). The application may be an application that can interlock with a voice search function, or that can recognize a text in which recognized speech is converted and that can search for predetermined information.

While the at least one application is being executed, the controller 180 performs one of a video call and voice call (S310). When a predetermined touch input is received while performing the call, the controller 180 displays a presently executing application list on the touch screen 151 (S320).

The controller 180 receives an input of selecting a specific application of the application list (S330) and enters a speech recognition mode. The controller 180 recognizes voice call contents or a specific voice command in the speech recognition mode (S340). The controller 180 extracts a search word for a voice search as a speech recognition result (S350).

The controller 180 determines whether the selected application supports a voice search (S360). If the selected application does not support a voice search, the controller 180 converts a recognized sound signal to a text and extracts a predetermined search word (S370). If the selected application supports a voice search, the controller 180 interlocks the extracted search word with the selected application and executes a search operation (S380).

Figure 13A:
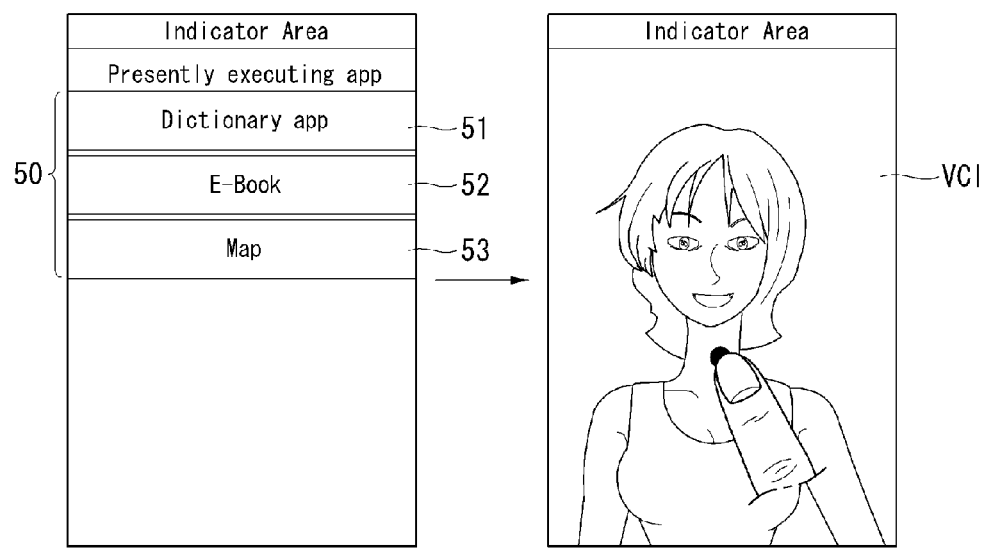

In order to describe in detail the embodiment shown in FIG. 12, FIGS. 13a and 13b, 14a and 14b, and 15a to 15d each will be described. Referring to FIG. 13a, the controller 180 executes at least one application before performing a call and displays at least one presently executing application list on the touch screen 151.

For example, the presently executing application may include an electronic dictionary application 51, an e-book application 52, and a map application 53. Thereafter, when the video call is connected, the controller 180 displays the other party's image VCI on the touch screen 151.

Figure 13B:
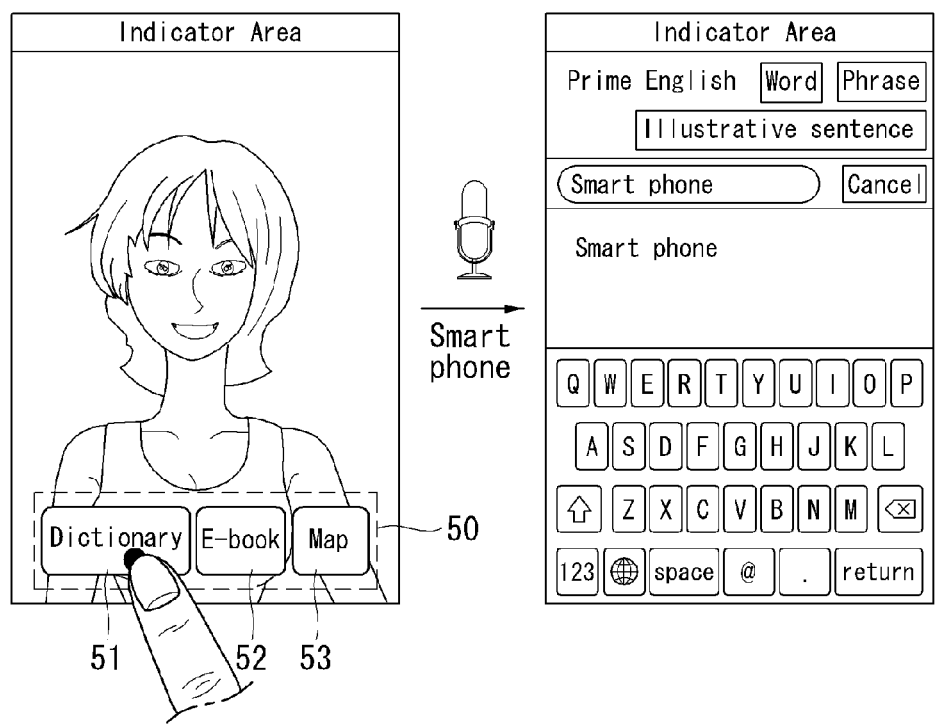

Referring to FIG. 13b, while executing the video call, the controller 180 displays a presently executing application list 50 on the touch screen 151. When the electronic dictionary application 51 is selected from the application list 50, the controller 180 tags voice call contents to the electronic dictionary application 51. For example, when a "smart phone" is included in the voice call contents, the controller 180 tags the "smart phone" to the electronic dictionary application and searches for the tagged speech in the electronic dictionary using the tagged "smart phone" as a search word.

Further, an application included in the presently executing application list 50 may be changed in a real time according to the recognized voice call contents. For example, although the presently executing application list 50 displayed on the touch screen does not comprise a dictionary application 51, if the recognized voice call contents comprises "you can find a meaning of "vague" by searching a dictionary", the controller 180 can add the dictionary application 51 in a real time in the presently executing application list 50. And for example, although the presently executing application list 50 displayed on the touch screen does not comprise a map application 51, if the recognized voice call contents comprises "I can't find an location for meeting", the controller 180 can add the map application 53 in a real time in the presently executing application list 50.

And the application being changed in a real time may be other application except an application most recently executed application.

Figure 14A:
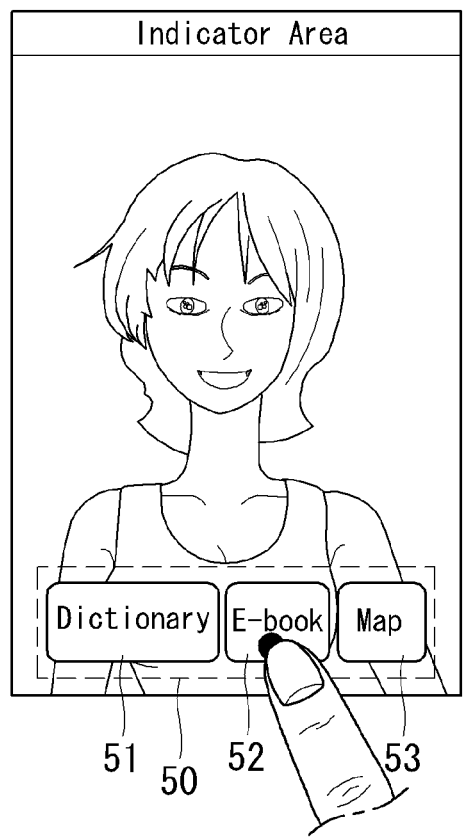
Figure 14B:
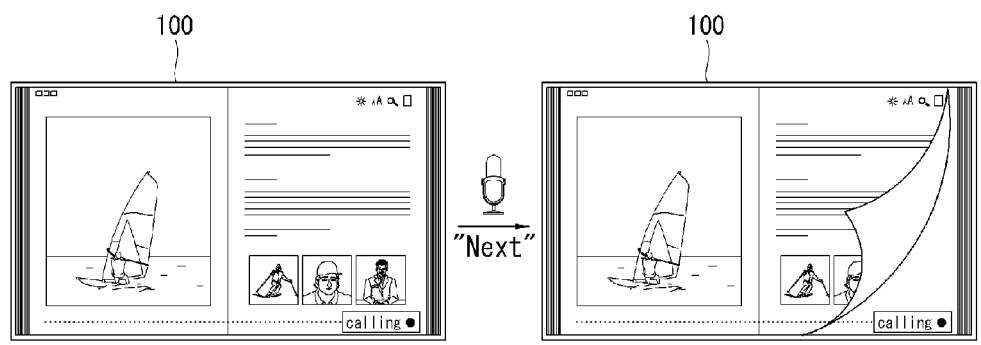
Figure 15A:
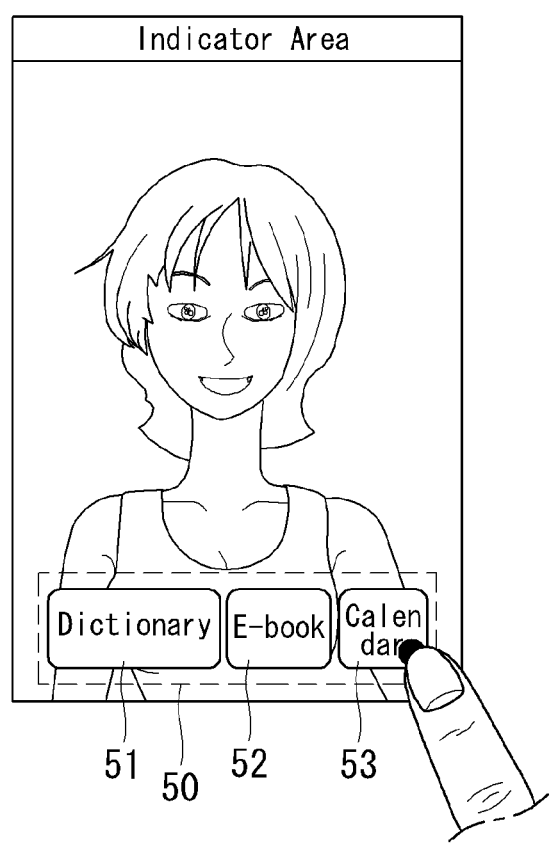
Figure 15C:
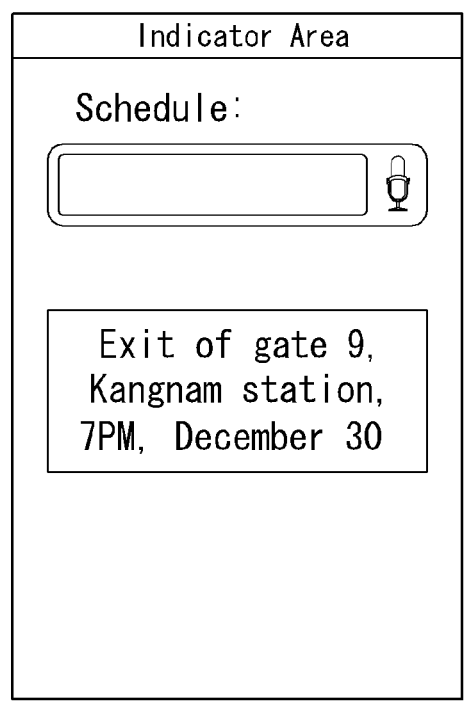

Next, FIGS. 14a and 14b illustrate a case where an already executing application is an e-book. Referring to FIG. 14a, when the e-book application 52 is selected from a presently executing application list 50 while performing video call, the controller 180 displays an execution screen of the e-book application on the touch screen 151 as shown in FIG. 14b. Thereafter, when communication contents of a "next page" are recognized, the controller 180 turns a page of an executing e-book to a next page and displays the next page as shown in FIG. 14b.

Next, FIGS. 15a to 15d illustrate a case where an already executing application is a calendar application. When a calendar application 53 is selected from a presently executing application list 50 (see FIG. 15a) while performing a video call, the controller 180 displays a calendar application execution screen on the touch screen 151, and a specific date SD may be selected (see FIG. 15b).

Accordingly, the controller 180 recognizes communication contents while executing a calendar application, and when a sound signal that can control execution of a calendar application is detected from the communication contents (FIG. 15c), the controller 180 maps and stores the detected sound signal to the selected specific date SD (FIG. 15d). The controller 180 maps the voice tag identifier 12 to the specific date SD and displays the voice tag identifier 12.

Accordingly, according to a method of controlling a mobile terminal in accordance with an embodiment of the present invention, a schedule can be simply set and the schedule can be registered to a calendar application through a process of selecting a calendar application while performing call and a process of selecting a specific date.

In the present invention, a process of selecting one application from a presently executing application list while performing a call is described, but the present invention is not limited thereto. For example, when schedule related information is recognized in communication contents, the controller 180 determines whether an application to register the schedule related information exists in presently executing applications, and if an application to register the schedule related information exists in presently executing applications, the controller 180 tags a sound signal including the schedule related information to the application to register the schedule related information.

If an application to register the schedule related information does not exist in presently executing applications, the controller 180 automatically executes a calendar application and automatically tags recognized speech.

In the foregoing embodiment, by tagging a recognized sound signal to a predetermined item (including at least one application that can interlock with a voice search function) through a speech recognition process while performing a call, an example of using the recognized sound signal in execution of a predetermined item has been described.

Hereinafter, embodiments of storing and editing an execution result of the item and sharing the result with an external device will be described. FIG. 16 is a flowchart illustrating a method of controlling a mobile terminal according to an embodiment of the present invention.

Referring to FIG. 16, the mobile terminal 100 executes communication with an external device through the mobile communication module 112 and/or the camera 121 (S400). The controller 180 records voice call contents included in communication contents by activating the microphone 122 while performing the call (S410) and stores the voice call contents (S420).

Figure 17:
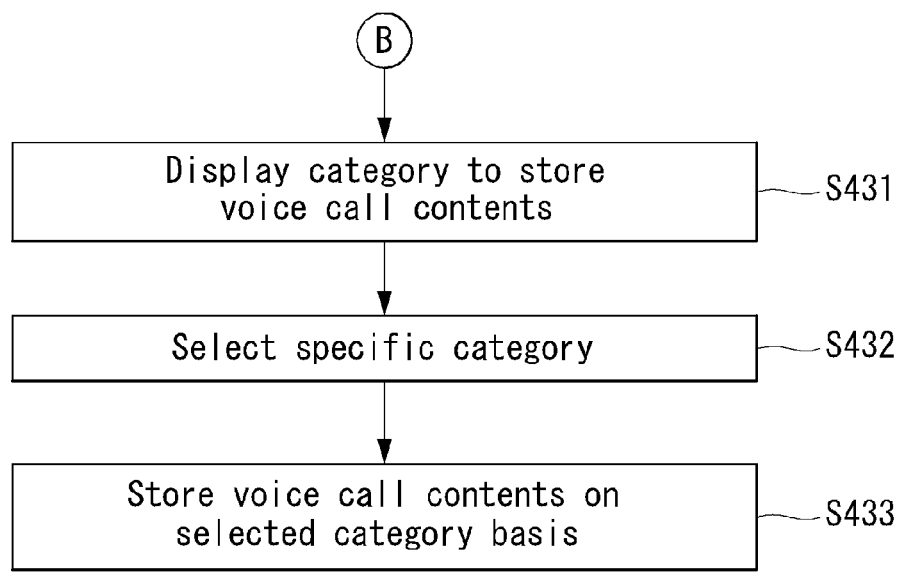
FIG. 17 is a flowchart illustrating an embodiment shown in FIG. 16.

Next, FIG. 17 is a flowchart illustrating an embodiment shown in FIG. 16, and FIGS. 18a to 18c are diagrams illustrating an embodiment shown in FIG. 17. The control method may be executed by the control of the controller 180.

Referring to FIG. 17, the controller 180 displays a category to store voice call contents on the touch screen 151 (S431). When one category is selected from the displayed categories (S432), the controller 180 stores recorded voice call contents (S433).

Figure 18A:
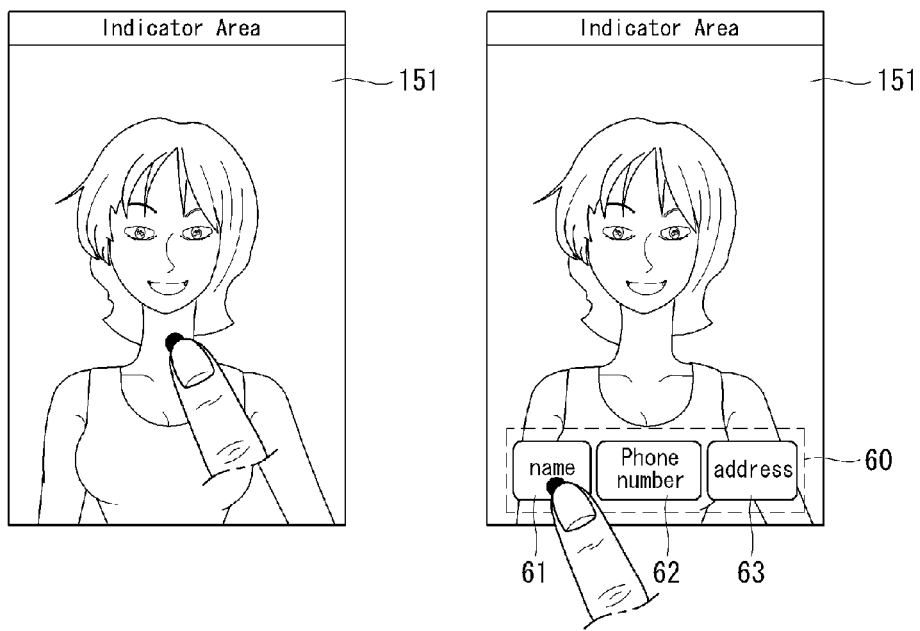
FIGS. 18a to 18c are diagrams illustrating an embodiment shown in FIG. 17.

Referring to FIG. 18a, in a state in which video call contents are recorded, when a predetermined input to the touch screen 151 is received, the controller 180 displays a category 60 to store recorded voice call contents on the touch screen 151.

The category 60 may include a name 61, a phone number 62, and an address 63. Hereinafter, an example of selecting a category of the name 61 and storing voice call contents according to the name category will be described.

Figure 18B:
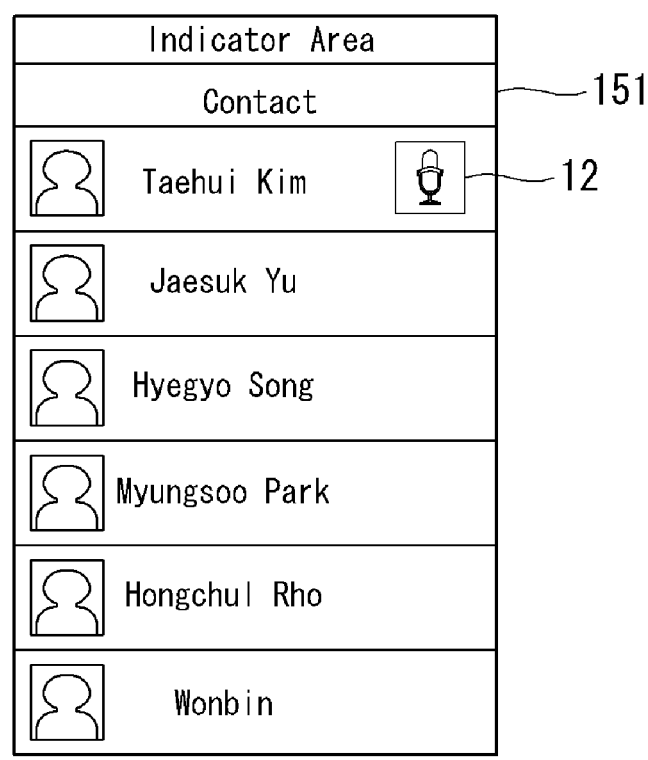
Figure 18C:

Referring to FIG. 18b, the controller 180 maps the voice tag identifier 12 to a name data list of video call another party of a user name data list in a phonebook application and displays the voice tag identifier 12. Further, referring to FIG. 18c, when an item of the phone number 62 is selected from the category 60, the controller 180 maps the voice tag identifier 12 to the other party's phone number data list of a user phone number data list in the phonebook application and displays the voice tag identifier 12.

Accordingly, a user of the mobile terminal 100 can easily determine a situation in which communication contents are recorded and tagged on a user basis of a contact list. Further, when the voice tag identifier 12 is selected from the contact list, the controller 180 reproduces recorded voice call contents.

According to a method of controlling a mobile terminal in accordance with an embodiment of the present invention, recorded communication contents may be edited, and edited contents may be reused in execution of a specific item.

Figure 19:
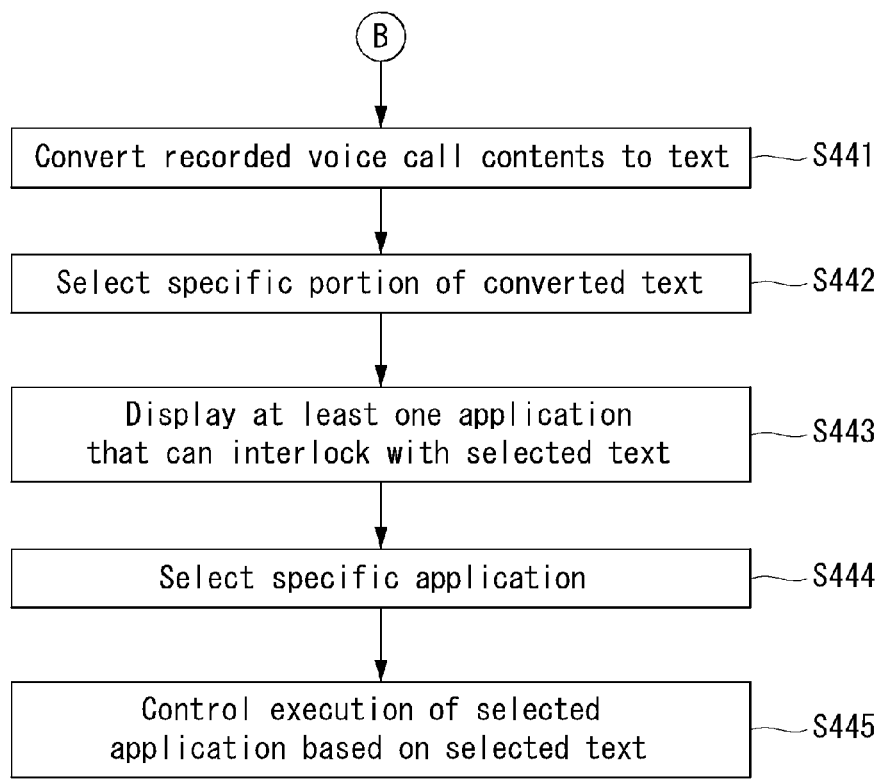
FIG. 19 is a flowchart illustrating an embodiment shown in FIG. 16.

FIG. 19 is a flowchart illustrating an embodiment shown in FIG. 16, and FIGS. 20a to 20d are diagrams illustrating an embodiment shown in FIG. 19. The control method may be executed by the control of the controller 180.

Referring to FIG. 19, in order to edit recorded voice call contents, the controller 180 converts the recorded voice call contents to text (S441). Thereafter, the controller 180 receives a selection signal indicating a selection of a specific portion of the converted text (S442). Here, a specific portion of the converted text indicates at least one word of text formed with a plurality of words.

The controller 180 displays at least one application that can interlock with the selected text on the touch screen 151 (S443). Here, at least one application that can interlock with the selected text is an application that can use the selected text when executing the application. For example, when the selected text is a "date", an application that can interlock with the selected text may be a calendar application.

A method of selecting the specific portion can be performed through a touch input of dragging a corresponding text. Thereafter, when a specific application is selected (S444), the controller 180 controls execution of the selected application based on the selected text (S445).

Figure 20A:
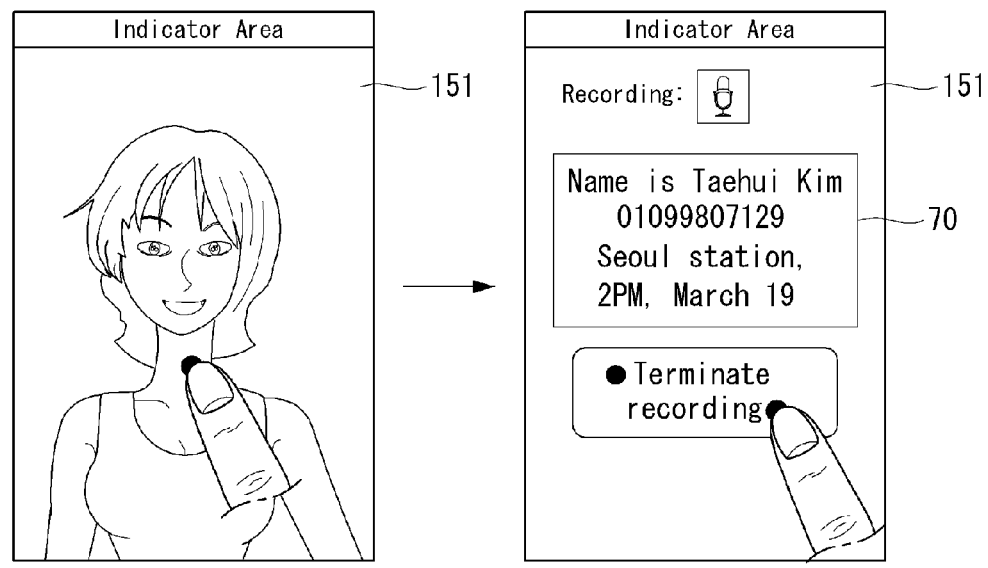

In order to describe in detail an embodiment shown in FIG. 19, a description will be described with reference to FIGS. 20a to 20d. Referring to FIG. 20a, the controller 180 records voice call contents while performing a video call and displays text 70 in which the recorded voice call contents are converted on the touch screen 151.

Figure 20B:
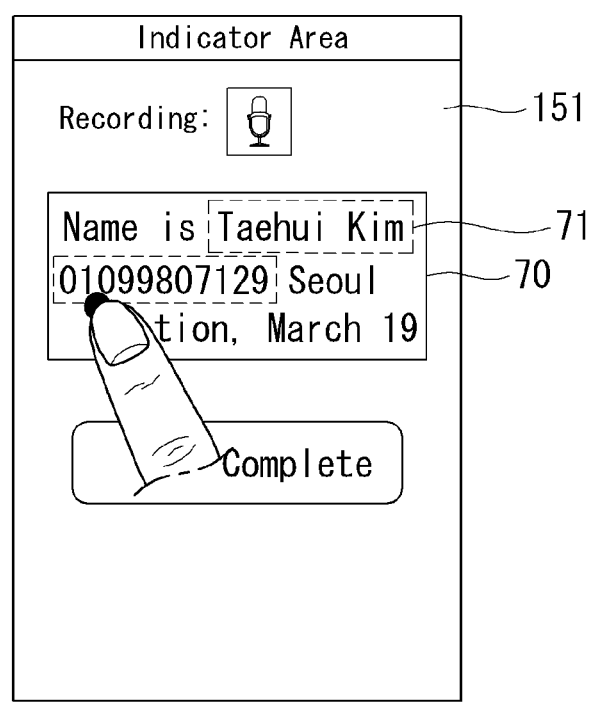
Figure 20C:
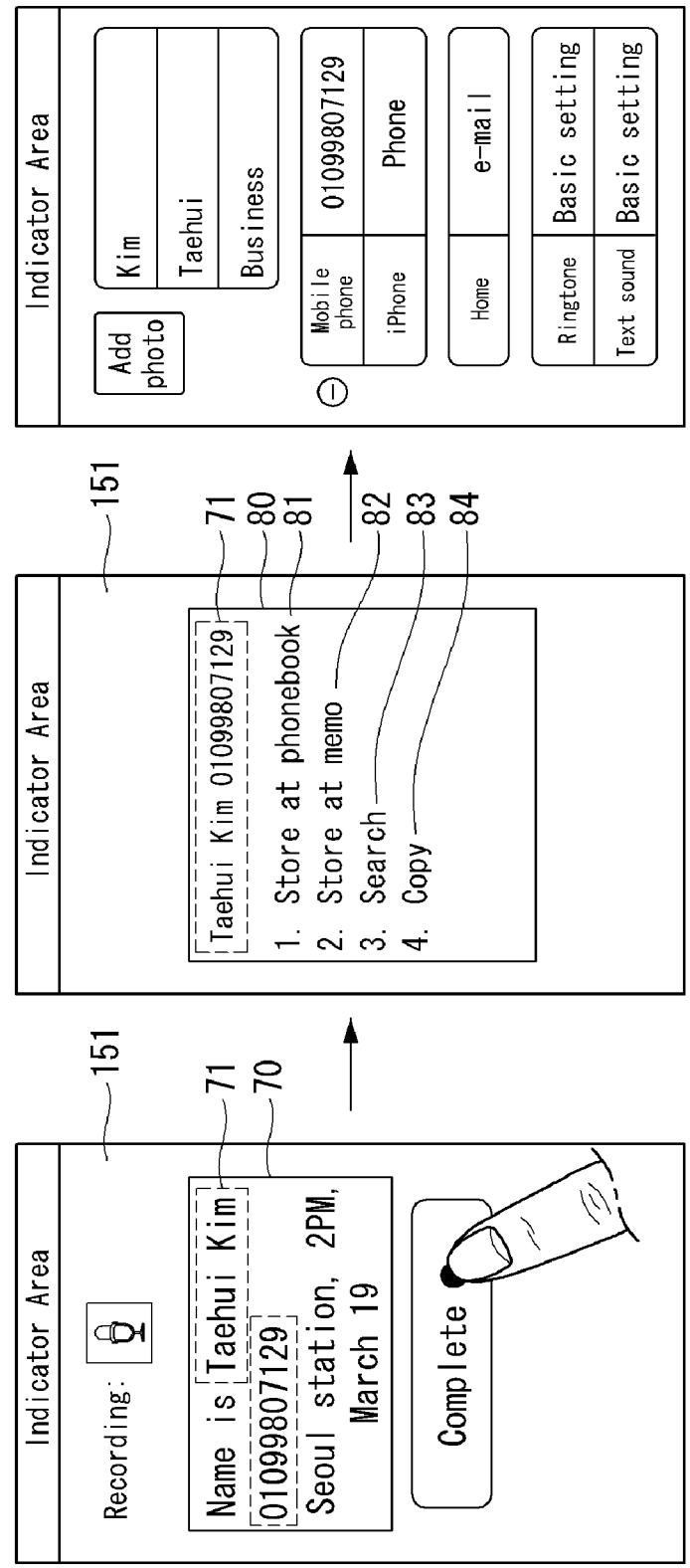

Referring to FIG. 20b, a specific portion, for example, a portion "Taehui Kim, 01099807129" 71 of the converted text 70 may be selected. Referring to FIG. 20c, the controller 180 displays at least one application list 80 that can interlock with the selected text 71 on the touch screen 151.

The application list 80 may include information about applications 81 and 82 to store the selected text 71 and methods 83 and 84 of editing the selected text 71. For example, as a contact list application 81 is selected from the application list 80, the controller 180 may interlock the selected text 71 with the contact list application 81.

Referring to FIG. 20d, when a selected portion of the converted text 70 is "Seoul Station 72, 2 PM, March 19", the controller 180 displays an application list 90 according to an attribute of the selected portion on the touch screen 151.

The selected portion is information related to a date, a time, and a place, and the controller 180 includes an application, for example, a calendar application that can interlock with the selected portion in the application list 90 and displays the application on the touch screen 151.

The application list 90 may include information about applications 91, 92, and 93 to store the selected text 72 and methods 94 and 95 of editing the selected text 72. When the calendar application 91 is selected from the application list 90, the controller 180 controls execution of a calendar application based on the selected text 72. That is, date, time, and place information corresponding to the selected text 72 may be registered to the calendar application.

According to a method of controlling a mobile terminal in accordance with an embodiment of the present invention, a specific sound signal is tagged and stored to a record file in which voice call contents are recorded.

Figure 21:
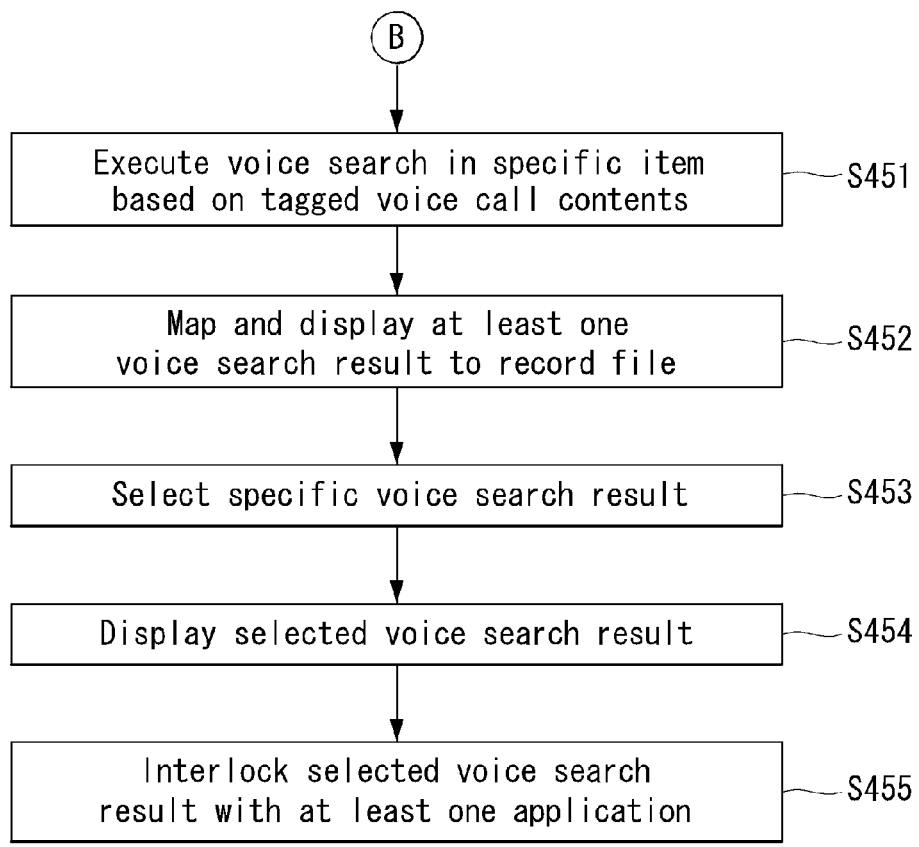
FIG. 21 is a flowchart illustrating a method of controlling a mobile terminal according to an embodiment of the present invention.

FIG. 21 is a flowchart illustrating a method of controlling a mobile terminal according to an embodiment of the present invention, and FIGS. 22, 23a and 23b, and 24a and 24b are diagrams illustrating an embodiment shown in FIG. 21. The control method may be executed by the control of the controller 180.

Referring to FIG. 21, the controller 180 executes a voice search in a specific item based on tagged voice call contents (S451). The controller 180 maps at least one voice search result to a recorded file and displays the at least one voice search result on the touch screen 151 (S452).

Figure 22:
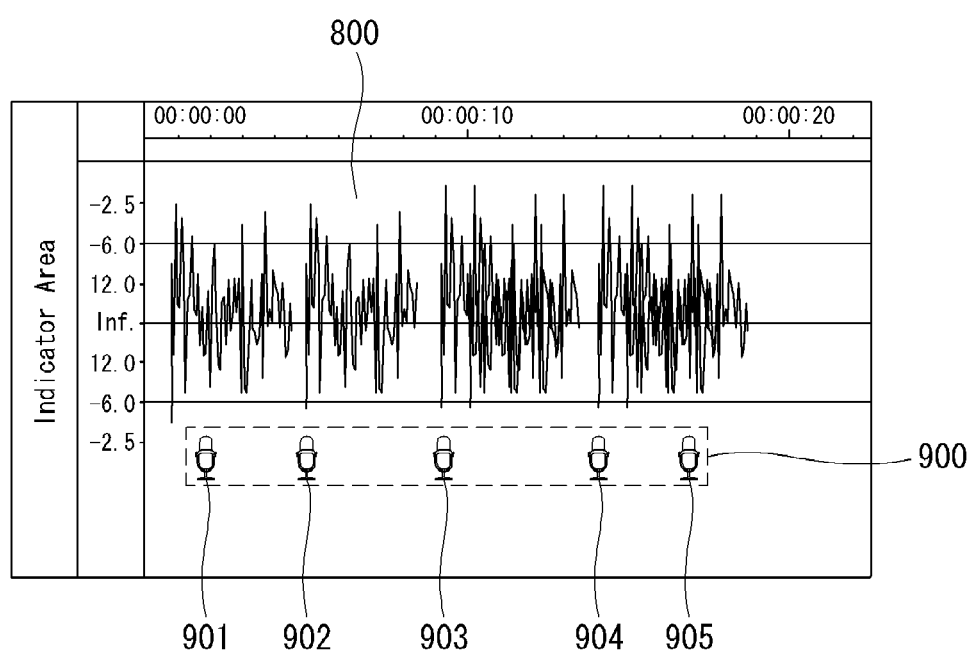
FIGS. 22, 23a and 23b, and 24a and 24b are diagrams illustrating an embodiment shown in FIG. 21.

As shown in FIG. 22, in the recorded file, voice call contents may be provided as a voice recorded file 800 of a graph form represented with a frequency size based on a communication time. The controller 180 tags a voice search result 900 performed based on voice call contents to the voice record file 800 of a graph form and stores the voice search result 900.

The voice search result 900 may be stored to be tagged to correspond to a stored time as a voice search is performed. Referring to FIG. 22, at the voice search result 900, voice call contents for 19 seconds after communication is started were recorded, a first voice search result 901 stored at about 2 seconds, a second voice search result 902 stored at about 5 seconds, a third voice search result 903 stored at about 9 seconds, a fourth voice search result 904 stored at about 14 seconds, and a fifth voice search result 905 stored at about 17 seconds are tagged and stored.

Here, each of the voice search results 901, 902, 903, 904, and 905 is tagged to a predetermined item while performing a call and corresponds to sound signals applied to execution of an item. Therefore, the voice search results are distinguished from a recorded file in which voice call contents with another party are simply recorded.

Figure 23A:
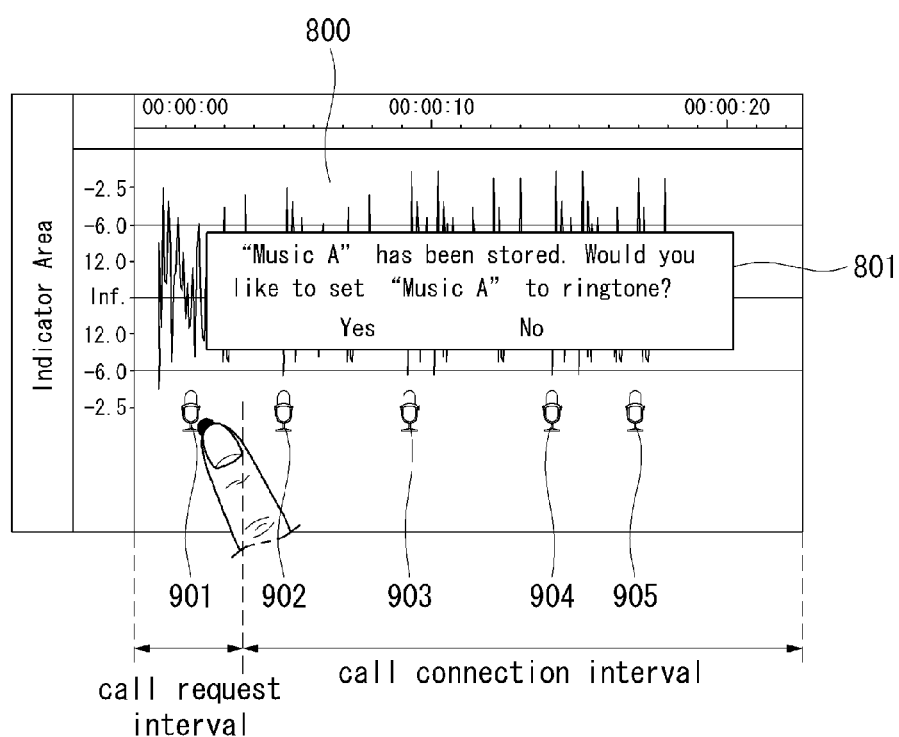

Referring to FIG. 23a, a communication segment (e.g., 20 seconds) is classified as a segment in which communication is performed as a communication call is connected to a communication call request segment. A sound recognized at the communication call request segment may be a communication connection sound (music A) of another party's terminal. Therefore, when an input of selecting the first voice search result 901 is received, the controller 180 changes a communication connection sound (e.g., ring tone) of the mobile terminal 100 to music A. For example, the controller 180 displays text 801 asking the user if they want to change the ringtone to music A.

Figure 23B:
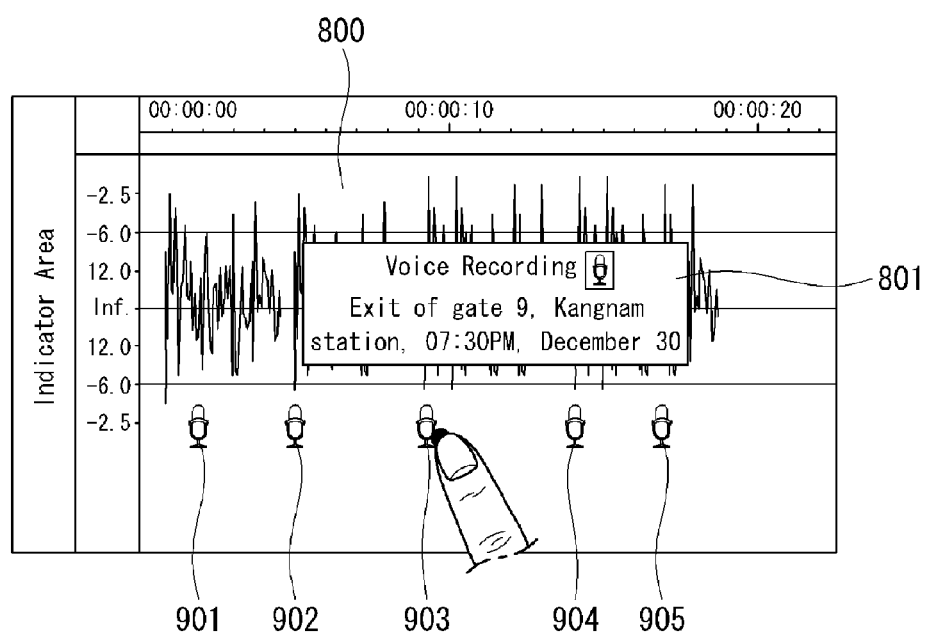

Referring to FIG. 23b, at a segment in which communication is performed, voice call contents with another party are generally recorded, and when an input of selecting the third voice search result 903 is received, the controller 180 displays text 801 corresponding to the third voice search result on the touch screen 151.

Here, it can be seen that a process of registering a predetermined schedule in a calendar with contents of "Exit of gate 9, Kangnam station, 7:30 PM, December 30," while performing call and interlocking with communication contents with a specific item exists through the third voice search result 903.

Figure 24A:
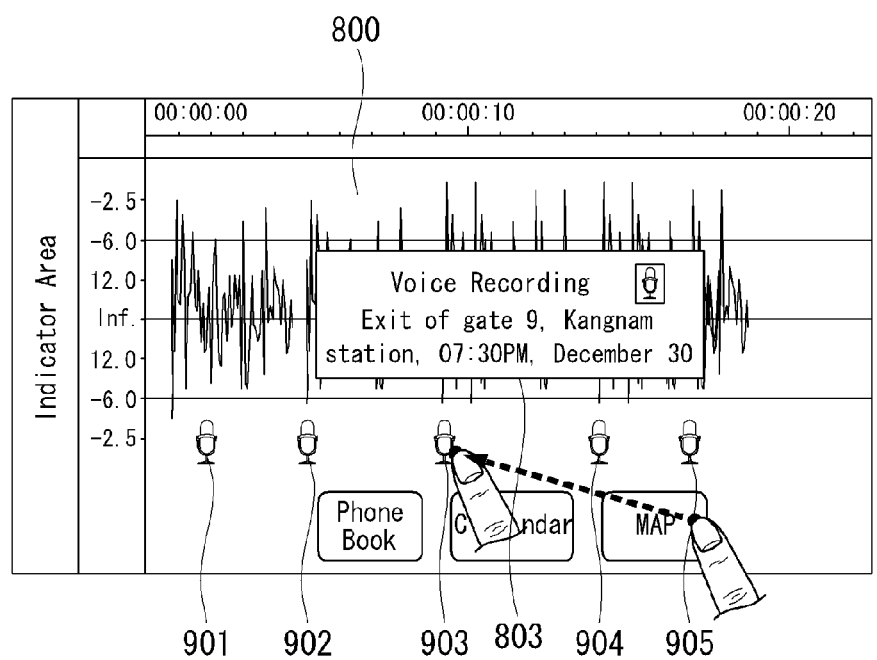

Referring to FIG. 24a, when an input of moving a specific application to a voice search result is received, in order to control execution of the specific application, the controller 180 uses the voice search result.

For example, referring to FIG. 24a, when a drag input of moving a map application to the third voice search result 903 is received, voice call contents used for the voice search result 903 may be used for execution of a map application.

That is, when a user selects the voice search result 903, the controller 180 displays schedule information 803 of a message form on the touch screen 151. Further, when a touch input of dragging a map application to the voice search result 903 is received, the controller 180 executes a map application, searches for a position corresponding to the voice search result on a map, and displays the position.

Figure 24B:
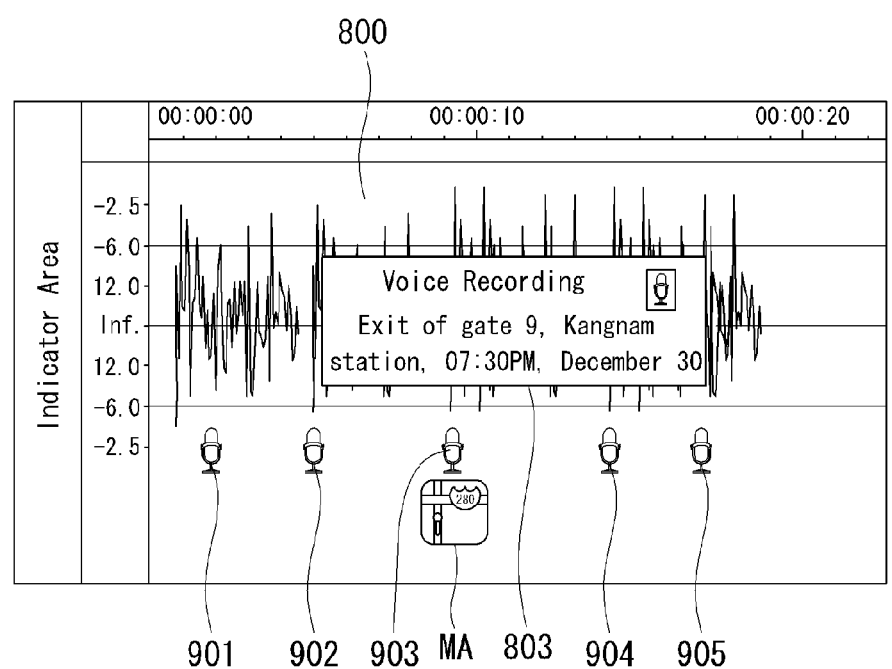

Further, referring to FIG. 24b, the controller 180 maps a map application icon MA to the third voice search result 903 and to display the MA.

According to a method of controlling a mobile terminal in accordance with an embodiment of the present invention, a kind of items applied according to an attribute of a sound signal output on a communication segment basis while performing call may be differently set.

Figure 25:
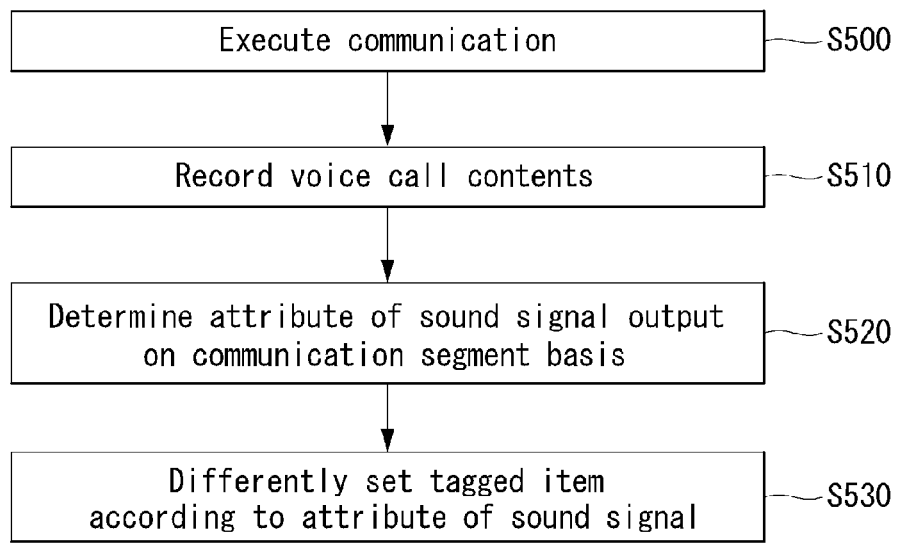
FIG. 25 is a flowchart illustrating a method of controlling a mobile terminal according to an embodiment of the present invention.

Next, FIG. 25 is a flowchart illustrating a method of controlling a mobile terminal according to an embodiment of the present invention. Referring to FIG. 25, the controller 180 performs one of a voice call and video call through the mobile communication module 112 and/or the camera 121 (S500).

The controller 180 records voice call contents (S510), and determines an attribute of a sound signal output on a communication segment basis (S520). Accordingly, the controller 180 differently sets an item to which a sound signal is tagged according to an attribute of the output sound signal (S530). Here, a sound signal output on a communication segment basis includes a sound signal output at a communication call connection request segment and a sound signal output at a segment in which voice communication with another party is performed as a communication call is connected.

In an attribute of a sound signal output on each segment basis, a voice output at a communication call connection request segment may be a communication connection sound, and a communication voice may be a speaker's communication voice according to communication contents with another party after a communication call is connected.

Therefore, before a communication call is connected (e.g., a communication call request segment of FIG. 23a), the controller 180 executes a predetermined application that can distinguish a communication connection sound and thus distinguishes music used for the communication connection sound.

According to a method of controlling a mobile terminal in accordance with an embodiment of the present invention, the mobile terminal 100 may tag video call contents to video call another party's image and store the video call contents.

Figure 27A:
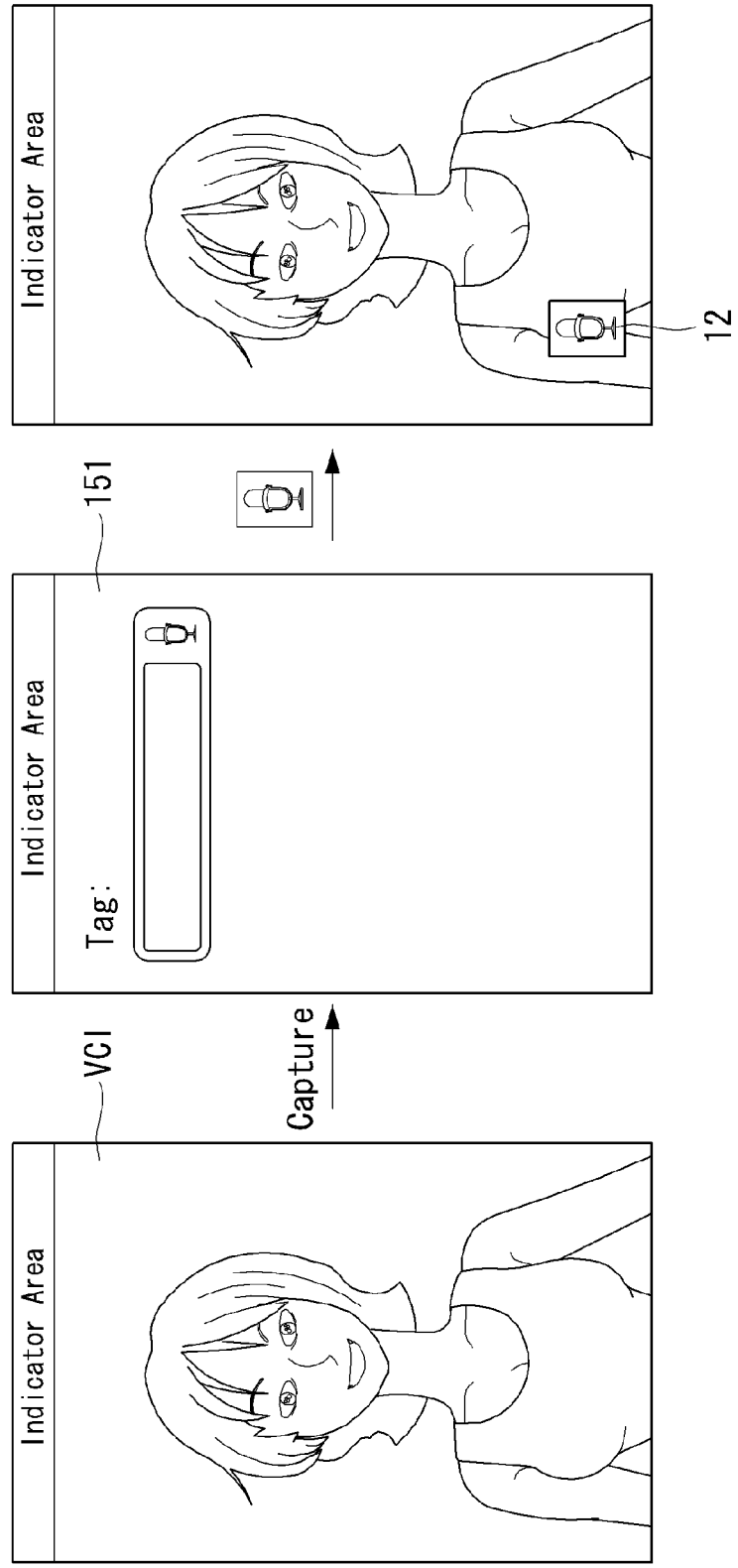
FIGS. 27a and 27b are diagrams illustrating an embodiment shown in FIG. 26.
Figure 27B:
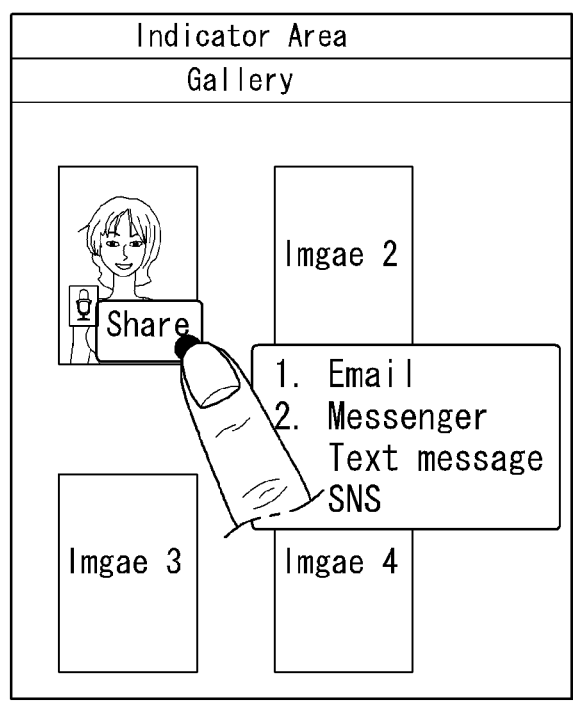

FIG. 26 is a flowchart illustrating a method of controlling a mobile terminal according to an embodiment of the present invention, and FIGS. 27a and 27b are diagrams illustrating an embodiment shown in FIG. 26. The control method may be executed by the control of the controller 180. Hereinafter, the method will be described with reference to FIGS. 26, 27a, and 27b.

The controller 180 executes a video call (S600), and displays another party's image VCI on the touch screen 151 (S610). The controller 180 also records video call contents while performing the video call. The controller 180 captures the other party's image displayed on the touch screen 151 (S620) and tags voice call contents to the captured image (S630). Further, the controller 180 maps the voice tag identifier 12 to the captured image and displays the voice tag identifier 12 (S640). FIG. 27a illustrates these features.

Referring to FIG. 27b, the controller 180 stores a capture image to which the voice tag identifier 12 is mapped in the memory 160 (S650). Further, the controller 180 shares a capture image to which the voice tag identifier 12 is mapped with an external device.

The above-described method of controlling a mobile terminal according to the present invention may be written and provided in a computer readable recording medium with a program to execute in a computer.

The method of controlling the mobile terminal according to the present invention may be executed through software. When executed with the software, constituent means of the present invention are code segments that perform required tasks. Programs or code segments may be stored in a processor readable medium or may be transmitted by a computer data signal combined with a carrier through a transmission medium or a communication network.

The computer readable recording medium may be any data storage device for storing data that can be read by a computer system. The computer readable recording medium may include, for example, a ROM, a RAM, a CD-ROM, a DVD±ROM, a DVD-RAM, a magnetic tape, a floppy disk, a hard disk, and an optical data storage device. The computer readable recording medium may also be distributed in a computer system connected to a network and thus a computer readable code may be stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal, comprising:
a speech recognition unit configured to recognize input speech;
a mobile communication unit configured to perform a video call with at least one other terminal; and
a controller configured to:
receive a predetermined input while performing the video call,
recognize voice call contents through the speech recognition unit based on the received predetermined input,
display, while performing the video call, a list including at least one application that was executing before the video call was performed, wherein the at least one application is interlocked with a voice search function,
receive an input for selecting a specific application from the displayed list,
tag the recognized voice call contents to the selected application executed by the mobile terminal,
execute the selected application using the tagged voice call contents,
transmit an execution result of the selected application to at least one external device through a wireless communication unit of the mobile terminal, and
display a screen related to the video call after transmitting the execution result of the selected application.

2. The mobile terminal of claim 1, wherein the controller is further configured to execute a search operation in the selected application according to a search word corresponding to the voice call contents tagged to the selected application.

3. The mobile terminal of claim 2, wherein the at least one application includes any one or more of a web browser application, phonebook application, map application, e-book application, electronic dictionary application, and calendar application.

4. The mobile terminal of claim 2, wherein the controller is further configured to map a voice tagging identifier identifying that the recognized voice call contents are tagged to the at least one application, and to control a display unit to display the voice tagging identifier along with an indicator indicating the at least one application.

5. The mobile terminal of claim 1,
wherein the at least one application is changed in real time according to the recognized voice call contents.

6. The mobile terminal of claim 1, wherein the controller is further configured to store the voice call contents in a memory, to convert the stored voice call contents to text, to display the converted text, to receive a selection signal indicating a selection of a portion of the displayed text, to display a list of applications that can be interlocked with the selected portion of text, and to execute a selected application using the selected portion of text.

7. The mobile terminal of claim 1, wherein the controller is further configured to display at least one category to store the voice call contents, to receive a selection signal indicating a selection of one category, and to store the voice call contents according to the selected one category.

8. The mobile terminal of claim 1, wherein the video call includes at least a first call interval followed by a second call interval in which the first call interval includes an output sound signal, and
wherein the recognized voice call contents includes the output sound signal in the first call interval.

9. The mobile terminal of claim 1,
wherein the controller is further configured to capture a counterparty's image displayed on a display unit of the mobile terminal while the video call is performed and to tag the recognized voice call contents to the captured image.

10. The mobile terminal of claim 9, wherein the controller is further configured to map a voice tagging identifier to the captured image and to store the voice tagging identifier mapped to the captured image in a memory.

11. The mobile terminal of claim 1, wherein the controller is further configured to transmit an execution result of the at least one application to at least one external device through a wireless communication unit of the mobile terminal.

12. The mobile terminal of claim 1,
wherein the controller is configured to acquire a sound signal through a microphone while performing the video call with the at least one external device through the mobile communication unit, to execute a voice search through a predetermined voice search application based on the acquired sound signal, and to store a voice search result.

13. A method of controlling a mobile terminal, the method comprising:
performing, via a mobile communication unit of the mobile terminal, a video call with at least one other terminal;
receiving, via a controller of the mobile terminal, a predetermined input while performing the video call;
recognizing, via a speech recognition unit of the mobile terminal, input voice call contents based on the received predetermined input;
displaying, while performing the video call, via a display unit of the mobile terminal, a list including at least one application that was executing before the video call was performed, wherein the at least one application is interlocked with a voice search function;
receive an input for selecting a specific application from the displayed list;

tagging, via the controller, the recognized voice call contents to the selected application executed by the mobile terminal;

executing, via the controller, the selected application using the tagged voice call contents;

transmitting an execution result of the selected application to at least one external device through a wireless communication unit of the mobile terminal; and displaying a screen related to the video call after transmitting the execution result of the selected application.

14. The method of claim 13, further comprising:

executing, via the controller, a search operation in the selected application according to a search word corresponding to the voice call contents tagged to the selected application, wherein the at least one application includes any one or more of a web browser application, phonebook application, map application, e-book application, electronic dictionary application, and calendar application.

15. The method of claim 13, further comprising:

mapping, via the controller, a voice tagging identifier identifying that the recognized voice call contents are tagged to the at least one application; and displaying, via a display unit of the mobile terminal, the voice tagging identifier along with an indicator indicating the at least one application.

16. The method of claim 13, wherein the at least one application is changed in real time according to the recognized voice call contents.

17. The method of claim 13, further comprising:

storing, in a memory associated with the mobile terminal, the voice call contents;

converting, via the controller, the stored voice call contents to text;

displaying, via a display unit of the mobile terminal, the converted text;

receiving, via the controller, a selection signal indicating a selection of a portion of the displayed text;

displaying, via the display unit, a list of applications that can be interlocked with the selected portion of text; and executing, via the controller, a selected application using the selected portion of text.

18. The method of claim 13, further comprising:

displaying, via the display unit, at least one category to store the voice call contents; and receiving, via the controller, a selection signal indicating a selection of one category, and to store the voice call contents according to the selected one category.

19. The method of claim 13, wherein the video call includes at least a first call interval followed by a second call interval in which the first call interval includes an output sound signal, and wherein the recognized voice call contents includes the output sound signal in the first call interval.

20. The method of claim 13, further comprising:

capturing, via the controller, a counterparty's image displayed on a display unit of the mobile terminal while the video calling operation is performed and to tag the recognized voice call contents to the captured image; and mapping, via the controller, a voice tagging identifier to the captured image and to store the voice tagging identifier mapped to the captured image in a memory.

* * * * *